US011815686B2

(12) United States Patent
Yoon et al.

(10) Patent No.: US 11,815,686 B2
(45) Date of Patent: Nov. 14, 2023

(54) METHOD AND ELECTRONIC DEVICE FOR CHANGING SETTING OF DISPLAY

(71) Applicant: Samsung Electronics Co., Ltd., Gyeonggi-do (KR)

(72) Inventors: Jongmin Yoon, Gyeonggi-do (KR); Chulkwi Kim, Gyeonggi-do (KR); Jeongwon Park, Gyeonggi-do (KR); Younsang Yoo, Gyeonggi-do (KR); Chanmin Park, Gyeonggi-do (KR); Donghyun Yeom, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 17/493,982

(22) Filed: Oct. 5, 2021

(65) Prior Publication Data

US 2022/0066221 A1 Mar. 3, 2022

Related U.S. Application Data

(63) Continuation of application No. PCT/KR2021/011509, filed on Aug. 27, 2021.

(30) Foreign Application Priority Data

Sep. 3, 2020 (KR) .................. 10-2020-0112612

(51) Int. Cl.
*G02B 27/01* (2006.01)
*G02B 27/00* (2006.01)
(Continued)

(52) U.S. Cl.
CPC ..... *G02B 27/0172* (2013.01); *G02B 27/0093* (2013.01); *G06F 3/013* (2013.01);
(Continued)

(58) Field of Classification Search
USPC .......................................................... 345/8
See application file for complete search history.

(56) References Cited

U.S. PATENT DOCUMENTS 9,317,114 B2   4/2016  Hwang
2012/0099195 A1*  4/2012  Choi .................. G02B 30/24
                                                              359/466

(Continued)

FOREIGN PATENT DOCUMENTS

KR   10-2016-0024487 A   3/2016
KR   10-2018-0015524 A   2/2018
(Continued)

OTHER PUBLICATIONS

International Search Report dated Dec. 13, 2021.

*Primary Examiner* — Chineyere D Wills-Burns
(74) *Attorney, Agent, or Firm* — Cha & Reiter, LLC

(57) ABSTRACT

An electronic device and method are disclosed. The electronic device includes a first camera configured to capture a frontal external environment of the electronic device, a second camera oriented opposite to the first camera and configured to capture gaze directions of a user's left eye and right eye, a first display panel corresponding to the left eye, a second display panel corresponding to the right eye, a memory, and a processor that implements the method, including: identifying, using the second camera, a dominant eye and a non-dominant eye among the left eye and right eye, identifying a dominant display panel from among the first and second display panels corresponding to the dominant eye, and a non-dominant display panel from among the first and second display panels corresponding to the non-dominant eye, and changing settings of the dominant display panel to be different from settings of the non-dominant display panel.

15 Claims, 18 Drawing Sheets

(51) Int. Cl.
  *G06F 3/01* (2006.01)
  *G02B 30/22* (2020.01)
(52) U.S. Cl.
  CPC ........ *G06F 3/017* (2013.01); *G02B 2027/014* (2013.01); *G02B 2027/0138* (2013.01); *G02B 2027/0143* (2013.01); *G02B 2027/0178* (2013.01)

(56) References Cited

U.S. PATENT DOCUMENTS

| | | | | |
|---|---|---|---|---|
| 2012/0302289 | A1* | 11/2012 | Kang | G06F 3/016 455/557 |
| 2014/0145914 | A1* | 5/2014 | Latta | G06F 3/013 345/8 |
| 2014/0362446 | A1* | 12/2014 | Bickerstaff | G02B 27/0093 359/630 |
| 2016/0062116 | A1 | 3/2016 | Ham et al. | |
| 2016/0139762 | A1* | 5/2016 | Meir | G06V 40/161 345/156 |
| 2017/0123492 | A1* | 5/2017 | Marggraff | G02B 27/0093 |
| 2018/0059420 | A1 | 3/2018 | Woo et al. | |
| 2018/0081429 | A1* | 3/2018 | Akenine-Moller | G06T 3/0093 |
| 2019/0096357 | A1* | 3/2019 | Lee | G06F 3/0304 |
| 2019/0108383 | A1* | 4/2019 | Klingström | G06T 7/74 |
| 2019/0158819 | A1 | 5/2019 | Hong et al. | |
| 2019/0208190 | A1* | 7/2019 | Crisler | H04N 13/344 |
| 2019/0377191 | A1* | 12/2019 | Hughes | G02B 27/0176 |
| 2020/0004333 | A1 | 1/2020 | Lee | |
| 2020/0051265 | A1 | 2/2020 | Kim et al. | |
| 2020/0120322 | A1* | 4/2020 | Ogasawara | H04N 13/122 |
| 2020/0218915 | A1* | 7/2020 | Jakubiak | G06V 40/172 |
| 2020/0311416 | A1* | 10/2020 | Xiong | G06T 7/593 |
| 2020/0326775 | A1* | 10/2020 | Koo | G06T 7/521 |
| 2020/0387286 | A1* | 12/2020 | Ravasz | G06V 40/20 |
| 2021/0089121 | A1* | 3/2021 | Rönngren | G02B 27/0093 |
| 2021/0096368 | A1* | 4/2021 | Carlsson | G02B 27/0172 |
| 2021/0263308 | A1* | 8/2021 | Watabe | G09G 3/001 |

FOREIGN PATENT DOCUMENTS

| | | |
|---|---|---|
| KR | 10-2018-0025524 A | 3/2018 |
| KR | 10-2019-0082688 A | 7/2019 |
| KR | 10-2020-0017172 A | 2/2020 |
| KR | 10-2020-0093926 A | 8/2020 |

\* cited by examiner

| TIME INTERVAL | LEFT EYE | RIGHT EYE |
|---|---|---|
| 0 | FHD | HD |
| 1s | FHD | FHD |
| 2s | FHD | HD |
| 3s | FHD | FHD |
| 4s | FHD | HD |
| 5s | FHD | FHD |

[b]

| TIME INTERVAL | LEFT EYE | RIGHT EYE |
|---|---|---|
| 0 | FHD | HD |
| 1s | FHD | HD |
| 2s | FHD | HD |
| 3s | FHD | HD |
| 4s | FHD | HD |
| 5s | FHD | HD |

FIG. 8

| TIME INTERVAL | LEFT EYE | RIGHT EYE |
|---|---|---|
| 0 | 120Hz | 60Hz |
| 1s | 120Hz | 120Hz |
| 2s | 120Hz | 60Hz |
| 3s | 120Hz | 120Hz |
| 4s | 120Hz | 60Hz |
| 5s | 120Hz | 120Hz |

[a]

| TIME INTERVAL | LEFT EYE | RIGHT EYE |
|---|---|---|
| 0 | 120Hz | 60Hz |
| 1s | 120Hz | 60Hz |
| 2s | 120Hz | 60Hz |
| 3s | 120Hz | 60Hz |
| 4s | 120Hz | 60Hz |
| 5s | 120Hz | 60Hz |

[b]

METHOD AND ELECTRONIC DEVICE FOR CHANGING SETTING OF DISPLAY

CROSS-REFERENCE TO RELATED APPLICATION

This application is a continuation of International Application No. PCT/KR2021/011509, filed on Aug. 27, 2021 which claims priority under 35 U.S.C. § 119 to Korean Patent Application No. 10-2020-0112612, filed on Sep. 3, 2020, in the Korean Intellectual Property Office, the disclosure of which is incorporated by reference herein in its entirety.

TECHNICAL FIELD

Certain embodiments of the disclosure relate to a method for changing settings of a virtual and augmented reality display and an electronic device.

BACKGROUND ART

With the development of digital technology, various types of electronic devices such as mobile communication terminals, personal digital assistants (PDAs), electronic organizers, smartphones, tablet personal computers (PCs), and wearable devices have become widely used. Development continues to support and increase the function of these electronic devices, resulting in improvements to hardware and/or the software.

For example, an electronic device may facilitate virtual reality (VR) services, allowing a user to have a realistic experience in a virtual world generated by a computer. In addition, the electronic device may provide augmented reality (AR) services, in which virtual information (or object) is added to a real-world view. Furthermore, some devices provide a mixed reality (MR) service in which a VR and AR are mixed into a single experience. The electronic device may include a heads-up display (HUD) to provide such VR and AR services.

Technical Problem

An electronic device such as a HUD may be worn on the user's head, and include a first panel corresponding to the left eye, and a second panel corresponding to the right eye. A display module may be included in the device frame (e.g., housing). The display module may include the first panel and second panel. The electronic device may display a screen through the first panel and the second panel with some matching elements (e.g., to provide a stereoscopic effect). When the electronic device outputs a screen through the first panel and the second panel, a large amount of power is consumed, the potential usage time of the electronic device may be reduced, and the temperature of the electronic device may increase due to the resultant generated heat.

Certain embodiments of the disclosure may provide device and a method that distinguishes between the dominant eye and the non-dominant eye of the user, and change settings of the display panel corresponding to the non-dominant eye to reduce power consumption.

Solution to Problem

An electronic device according to certain embodiments may include: a first camera configured to capture a frontal external environment of the electronic device, a second camera oriented opposite to the first camera and configured to capture gaze directions of a user's left eye and right eye, a first display panel corresponding to the left eye, a second display panel corresponding to the right eye, a memory, and a processor operably connected to the first camera, the second camera, the first display panel, the second display panel, and the memory, wherein the processor is configured to: identify, using the second camera, a dominant eye and a non-dominant eye among the left eye and right eye, identify a dominant display panel from among the first and second display panels corresponding to the dominant eye, and a non-dominant display panel from among the first and second display panels corresponding to the non-dominant eye, and change settings of the dominant display panel to be different from settings of the non-dominant display panel.

A method according to certain embodiments may include: identifying, using one or more of a first camera configured to capture a frontal external environment of the electronic device, or a second camera oriented opposite to the first camera and configured to capture gaze directions of user's left and right eyes, a dominant eye and a non-dominant eye from among the user's left eye and right eye, identifying, using at least one processor, a dominant display panel from among first and second display panels corresponding to the dominant eye, and a non-dominant display panel from among the first and second display panels corresponding to the non-dominant eye, and changing settings of the dominant display panel to be different from settings of the non-dominant display panel.

SUMMARY OF INVENTION

Certain embodiments of the disclosure may identify the dominant eye and/or the non-dominant eye from among the eyes of the user, and change at least some of settings of a display panel corresponding to the non-dominant eye, which may reduce current consumption of the electronic device.

According to certain embodiments, the electronic device may determine a dominant eye and a non-dominant eye of a user, and change settings of a display panel corresponding to the non-dominant eye to be at least partially different from the settings of the display panel corresponding to the dominant eye. The electronic device may change at least some of the settings of the display panel corresponding to the non-dominant eye so as to lower the quality of this display panel.

According to certain embodiments of the disclosure, with the change in settings to the display panel(s), current consumption of the electronic device may be reduced, the potential usage time of the device may increase, and heat generation may be reduced.

In addition, various effects directly or indirectly identified through this document may be provided.

BRIEF DESCRIPTION OF DRAWINGS

The above and other aspects, features, and advantages of the present disclosure will be more apparent from the following description taken in conjunction with the accompanying drawings, in which:

FIG. 6 is a table depicting a method for adjusting the resolution of the display panel corresponding to the non-dominant eye according to certain embodiments of the disclosure;

FIG. 8 is a table depicting a method for adjusting the frame rate of the display panel corresponding to the non-dominant eye according to certain embodiments of the disclosure;

DETAILED DESCRIPTION

Hereinafter, certain embodiments will be described in detail with reference to the accompanying drawings. It should be understood that the embodiments and the terminology used therein are not intended to limit the techniques described herein to specific embodiments but to include various modifications, equivalents, and/or alternatives thereof. In the description of the drawings, similar reference symbols may be used for similar components. The singular forms are intended to include the plural forms as well, unless the context clearly indicates otherwise.

Figure 1:
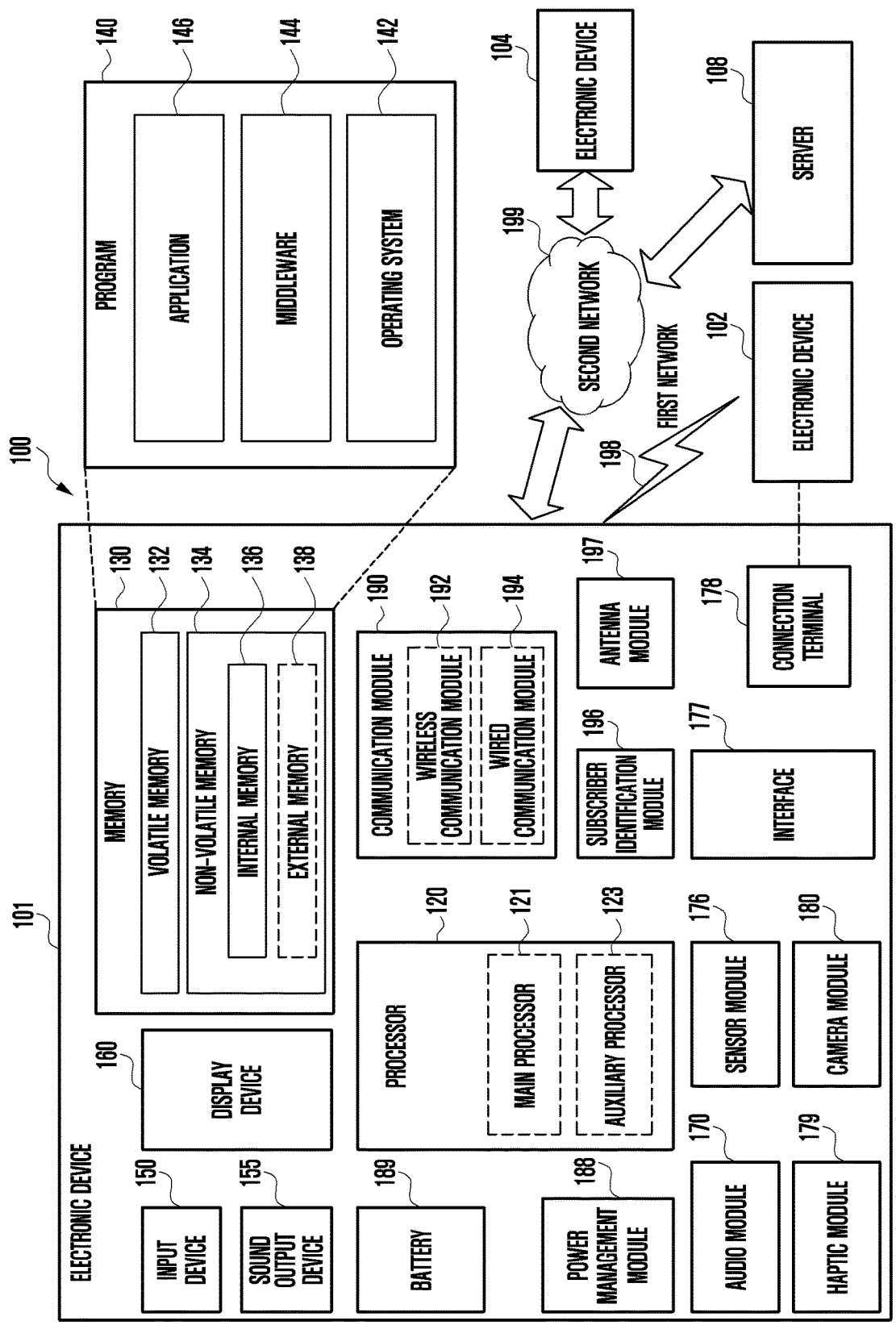
FIG. 1 is a block diagram illustrating an electronic device in a network environment according to an of the disclosure.

FIG. 1 illustrates an electronic device in a network environment according to an embodiment of the disclosure. Referring to FIG. 1, an electronic device 101 in a network environment 100 may communicate with an electronic device 102 via a first network 198 (e.g., a short-range wireless communication network), or at least one of electronic device 104 or a server 108 via a second network 199 (e.g., a long-range wireless communication network). The electronic device 101 may communicate with the electronic device 104 via the server 108. The electronic device 101 includes a processor 120, memory 130, an input module 150, an audio output module 155, a display module 160, an audio module 170, a sensor module 176, an interface 177, a connecting terminal 178, a haptic module 179, a camera module 180, a power management module 188, a battery 189, a communication module 190, a subscriber identity module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The audio output module 155 may output sound signals to the outside of the electronic device 101. The audio output module 155 may include, for example, a speaker or a receiver. The speaker may be used for general purposes, such as playing multimedia or playing record. The receiver may be used for receiving incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include a touch sensor adapted to detect a touch, or a pressure sensor adapted to measure the intensity of force incurred by the touch.

The audio module 170 may convert a sound into an electrical signal and vice versa. The audio module 170 may obtain the sound via the input module 150, or output the sound via the audio output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high-definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes. According to an embodiment, the camera module 180 may include a front camera disposed on the front surface of the electronic device 101 and a rear camera disposed on the rear surface of the electronic device 101.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. The antenna module 197 may include an antenna including a radiating element implemented using a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
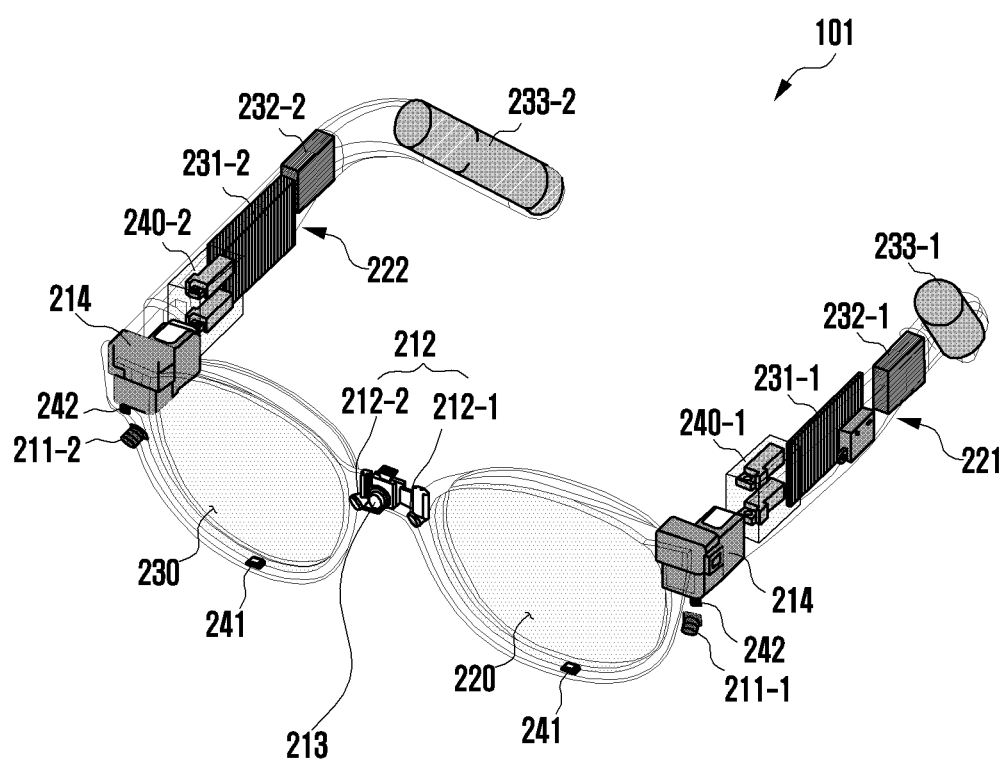
FIG. 2A is a view illustrating the overall configuration of an electronic device including a plurality of cameras according to certain embodiments of the disclosure.
Figure 2B:
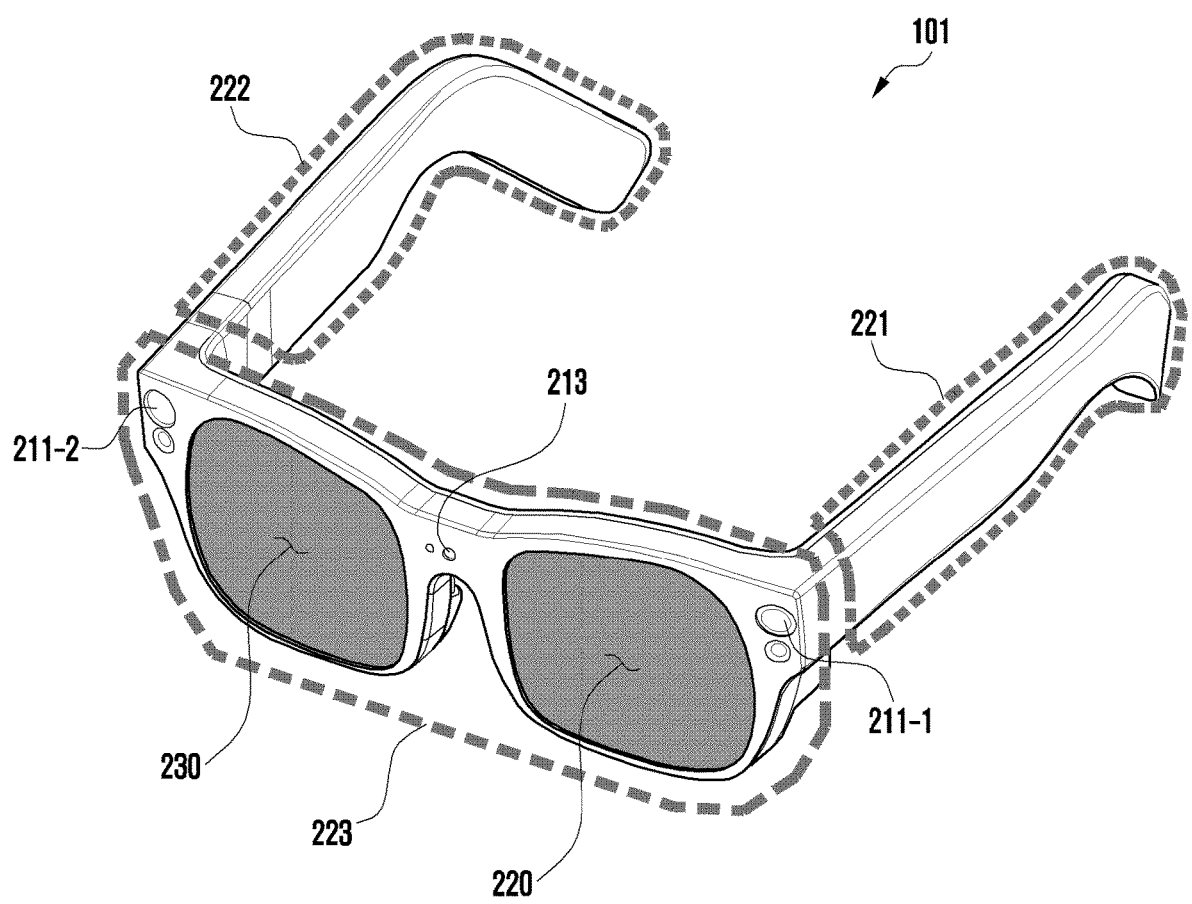
FIG. 2B is a front view of the electronic device according to certain embodiments of the disclosure.
Figure 2C:
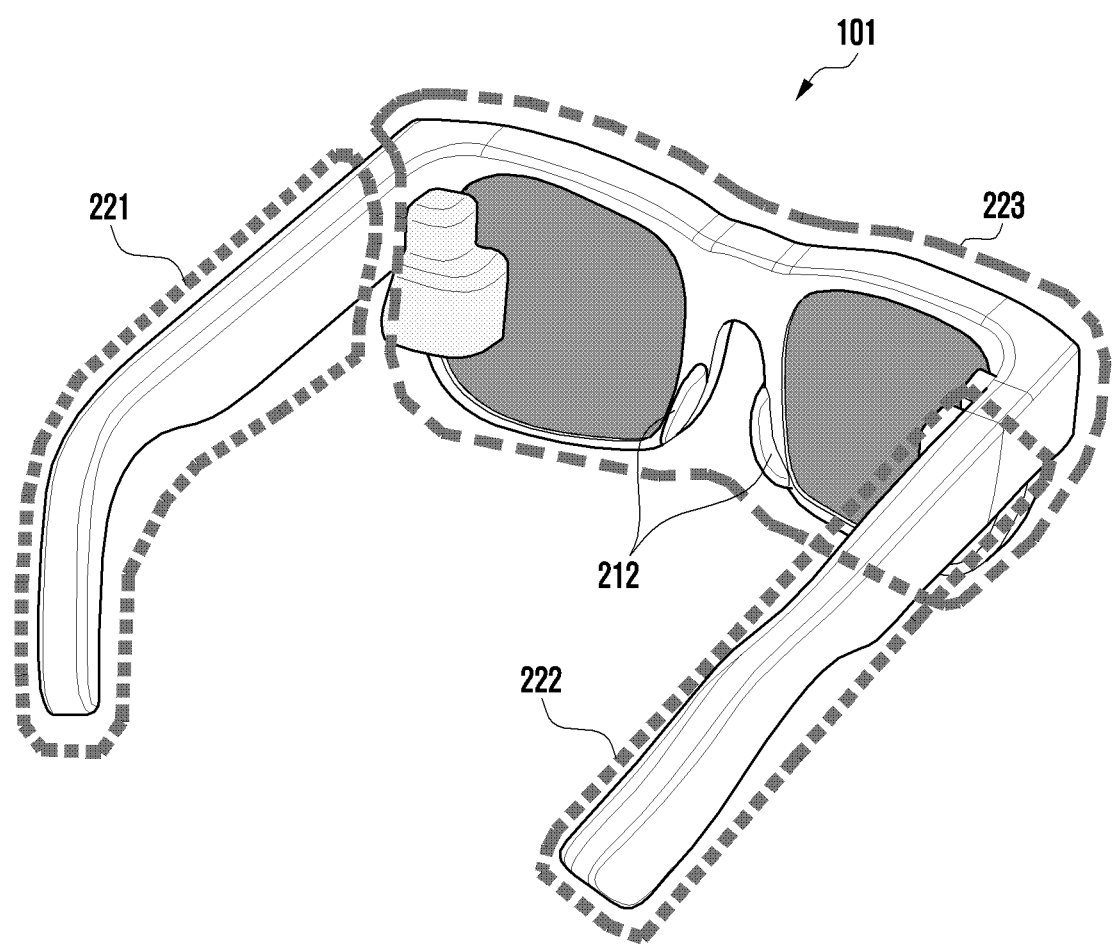
FIG. 2C is a rear view of the electronic device according to certain embodiments of the disclosure.

FIG. 2A illustrates the overall configuration of an electronic device (e.g., electronic device 101 in FIG. 1) including a plurality of cameras according to certain embodiments of the disclosure. FIG. 2B illustrates a front view of the electronic device according to certain embodiments of the disclosure. FIG. 2C illustrates a rear view of the electronic device according to certain embodiments of the disclosure. FIG. 2B is a first illustrative diagram showing a front portion of the electronic device 101, FIG. 2C is a second illustrative diagram showing a rear portion of the electronic device 101, and the internal configuration may be the same as the configuration shown in FIG. 2A.

In certain embodiments, the electronic device 101 may be worn on the user's head and provide the user with an image related to an augmented reality service. According to an embodiment, the electronic device 101 may provide an augmented reality service that outputs at least one virtual object seen as being superimposed on a region determined as the user's field of view (FoV). For example, the region determined as the user's field of view is a region determined to be recognizable by the user wearing the electronic device 101 through the electronic device 101, and may be a region including the whole or at least a part of the display module (e.g., display module 160 in FIG. 1) of the electronic device 101. According to an embodiment, the electronic device 101 may include a plurality of glasses (e.g., first glass 220 and/or second glass 230) corresponding to both eyes (e.g., left eye and/or right eye) of the user. The plural glasses may include at least a portion of a display module (e.g., first display module 351 and/or second display module 353 in FIG. 3). For example, the first glass 220 corresponding to the user's left eye may include the first display module 351, and the second glass 230 corresponding to the user's right eye may include the second display module 353. For example, the electronic device 101 may be configured in the form of at least one of, but not limited to, glasses, goggles, a helmet, or a hat.

With reference to FIG. 2A, the electronic device 101 according to an embodiment may include a display module 214 (e.g., display module 160 in FIG. 1), a camera module (e.g., camera module 180 in FIG. 1), an audio module (e.g., audio module 170 in FIG. 1), a first support part 221, and/or a second support part 222. According to an embodiment, the display module 160 may include a first display (e.g., first glass 220, first display module 351 in FIG. 3) and/or a second display (e.g., second glass 230, second display module 353 in FIG. 3). According to an embodiment, at least one camera may include a photographing camera 213 for capturing an image corresponding to the user's field of view (FoV) and/or measuring a distance to an environmental object, an eye tracking camera 212 for identifying the direction of the user's gaze, and/or a recognition camera (e.g., the gesture capturing camera) 211-1 or 211-2 for recognizing a specific space. For example, the photographing camera 213 may photograph the front direction of the electronic device 101, and the eye tracking camera 212 may photograph a direction opposite to the photographing direction of the photographing camera 213. For example, the eye tracking camera 212 may at least partially photograph both eyes of the user. According to an embodiment, the first support part 221 and/or the second support part 222 may include printed circuit boards (PCBs) 231-1 and 231-2, speakers 232-1 and 232-2, and/or batteries 233-1 and 233-2.

According to an embodiment, the display module 160 (e.g., display module 214 in FIG. 2A) may be disposed on the body part (e.g., body part 223 in FIG. 2B) of the electronic device 101 and may include a condensing lens (not shown) and/or a transparent waveguide (not shown) on the glasses (e.g., first glass 220 and second glass 230). For example, the transparent waveguide may be positioned at least partially in a portion of the glasses. According to an embodiment, the light emitted from the display module 160 may be incident on one end of the glasses through the first glass 220 and the second glass 230, and the incident light may be transmitted to the user through the waveguide formed in the glasses. The waveguide can be made of glass, plastic or polymer, and may include a nano-pattern, for example, a polygonal or curved grating structure formed on one surface of the inside or outside thereof. According to an embodiment, the incident light may be provided to the user by being propagated or reflected inside the waveguide by the nano-pattern. According to an embodiment, the waveguide may include at least one of at least one diffractive element (e.g., diffractive optical element (DOE), holographic optical element (HOE)) or at least one reflective element (e.g., reflective mirror). According to an embodiment, the waveguide may guide the display light emitted from the light source to the user's eyes by using at least one diffractive element or reflective element.

With reference to FIG. 2A, the first support part 221 and/or the second support part 222 may include printed circuit boards 231-1 and 231-2 for transmitting electrical signals to individual components of the electronic device 101, speakers 232-1 and 232-2 for outputting audio signals, batteries 233-1 and 233-2, and/or hinges 240-1 and 240-2 for at least partial coupling with the body part 223 of the electronic device 101. According to an embodiment, the speakers 232-1 and 232-2 may include a first speaker 232-1 for transmitting an audio signal to the user's left ear and a second speaker 232-2 for transmitting an audio signal to the user's right ear. The speakers 232-1 and 232-2 may be included in the audio module 170 in FIG. 1. According to an embodiment, the electronic device 101 may be equipped with a plurality of batteries 233-1 and 233-2, and may supply power to the printed circuit boards 231-1 and 231-2 through a power management module (e.g., power management module 188 in FIG. 1).

With reference to FIG. 2A, the electronic device 101 may include a microphone 241 to receive a voice of the user and an ambient sound. For example, the microphone 241 may be included in the audio module 170 in FIG. 1. The electronic device 101 may include at least one illumination device (illumination LED) 242 to increase the accuracy of at least one camera (e.g., photographing camera 213, eye tracking camera 212, and/or recognition camera 211-1 or 211-2). For example, the illumination device 242 may be used as an auxiliary device to increase the accuracy when photographing the user's pupil with the eye tracking camera 212, and the illumination device 242 may use an IR LED having an infrared wavelength rather than a visible light wavelength. As another example, the illumination device 242 may be used as an auxiliary device for photographing a user's gesture with the recognition cameras 211-1 and 211-2 when it is not easy to detect the subject to be photographed in a dark environment or due to mixing of multiple light sources and reflected light.

With reference to FIGS. 2B and 2C, the electronic device 101 according to an embodiment may include the body part 223 and the support parts (e.g., first support part 221 and/or second support part 222), and the body part 223 and the support parts 221 and 222 may be in an operably connected state. For example, the body part 223 and the support parts 221 and 222 may be operably connected through the hinges 240-1 and 240-2. The body part 223 may be at least partially mounted on the user's nose, and may include a display module 160 and a camera module (e.g., camera module 180 in FIG. 1). The support parts 221 and 222 may include support members to be mounted on the user's ears, and may include the first support part 221 to be mounted on the left ear and/or the second support part 222 to be mounted on the right ear. According to an embodiment, the first support part 221 or the second support part 222 may at least partially include the printed circuit board 231-1 or 231-2, the speaker 232-1 or 232-2, and/or the battery 233-1 or 233-2 (e.g., battery 189 in FIG. 1, first battery 333 and/or second battery 334 in FIG. 3). The battery may be electrically connected to the power management module (e.g., power management module 188 in FIG. 1).

According to an embodiment, the display module 160 may include the first glass 220 and/or the second glass 230, and may provide visual information to the user through the first glass 220 and the second glass 230. The electronic device 101 may include the first glass 220 corresponding to the left eye and/or the second glass 230 corresponding to the right eye. According to an embodiment, the display module 160 may include a display panel and/or a lens (e.g., glass). For example, the display panel may include a transparent material such as glass or plastic.

According to an embodiment, the display module 160 may include a transparent element, and the user can recognize the real space behind the display module 160 through the display module 160. The display module 160 may display a virtual object on at least a portion of the transparent element so that the virtual object is viewed by the user as being added to at least some of the real space. The first glass 220 and/or the second glass 230 included in the display module 160 may include plural display panels corresponding respectively to both eyes of the user (e.g., left eye and/or right eye).

According to an embodiment, the electronic device 101 may include a virtual reality (VR) device (e.g., virtual reality device). When the electronic device 101 is a VR device, the first glass 220 may be a first display module 351, and the second glass 230 may be a second display module 353.

According to an embodiment, the virtual object output through the display module 160 may include information related to an application program running on the electronic device 101 and/or information related to an external object located in the real space corresponding to a region determined as the user's field of view (FoV). For example, among image information related to the real space obtained through a camera of the electronic device 101 (e.g., photographing camera 213), the electronic device 101 may identify an external object included in at least a portion corresponding to the region determined as the user's field of view (FoV). The electronic device 101 may output (or display) a virtual object related to the external object identified in at least a portion through the region determined as the user's field of view among the display area of the electronic device 101. The external object may include a thing existing in the real space. According to certain embodiments, the display area in which the electronic device 101 displays a virtual object may include a part (e.g., at least a part of the display panel) of the display module (e.g., first display module 351 or second display module 353). According to an embodiment, the display area may be an area correspond to at least a portion of the first glass 220 and/or the second glass 230.

According to an embodiment, the electronic device 101 may include a photographing camera 213 (e.g., RGB camera) for capturing an image corresponding to the user's field of view (FoV) and/or measuring a distance to an object, an eye tracking camera 212 for identifying the gaze direction the user is looking at, and/or recognition cameras 211-1 and 211-2 (e.g., gesture camera) for recognizing a specific space. According to an embodiment, the electronic device 101 may measure a distance to an object located in the front direction of the electronic device 101 by using the photographing camera 213. According to an embodiment, in the electronic device 101, a plurality of eye tracking cameras 212 may be disposed corresponding to both eyes of the user. For example, the eye tracking camera 212 may photograph a direction opposite to the photographing direction of the photographing camera 213. The eye tracking camera 212 may detect the user's gaze direction (e.g., eye movement). For example, the eye tracking camera 212 may include a first eye tracking camera 212-1 for tracking the gaze direction of the user's left eye, and a second eye tracking camera 212-2 for tracking the gaze direction of the user's right eye. According to an embodiment, the electronic device 101 may detect a user gesture within a preset distance (e.g., specific space) by using the recognition cameras 211-1 and 211-2. For example, the recognition cameras 211-1 and 211-2 may be configured in plurality, and may be disposed on both sides of the electronic device 101. The electronic device 101 may detect an eye corresponding to the dominant eye and/or the non-dominant eye from among the left eye and/or the right eye by using at least one camera. For example, the electronic device 101 may detect an eye corresponding to the dominant eye and/or the non-dominant eye based on the user's gaze direction with respect to an external object or virtual object.

According to an embodiment, the photographing camera 213 may include a high-quality camera such as a high resolution (HR) camera and/or a photo video (PV) camera. According to an embodiment, the eye tracking camera 212 may track the gaze direction of the user by detecting the user's pupil, and may be used to move the center of a virtual image in response to the gaze direction. For example, the eye tracking camera 212 may be divided into a first eye tracking camera 212-1 corresponding to the left eye and a second eye tracking camera 212-2 corresponding to the right eye, and the cameras may be substantially the same in performance and/or specification. According to an embodiment, the recognition cameras 211-1 and 211-2 may be used for detecting the user's hand (gesture) and/or spatial recognition, and may include a global shutter (GS) camera. For example, the recognition cameras 211-1 and 211-2 may include a GS camera with less image delay like a rolling shutter (RS) camera in order to detect and track a fast hand gesture and/or a minute movement of a finger.

According to an embodiment, the electronic device 101 may display a virtual object and the augmented reality service based on the image information related to the real space obtained through the camera (e.g., camera module 180 in FIG. 1) of the electronic device 101. According to an embodiment, the electronic device 101 may display the virtual object based on the display modules disposed corresponding to both eyes of the user (e.g., first display module 351 corresponding to the left eye, and/or second display module 353 corresponding to the right eye). According to an embodiment, the electronic device 101 may display the virtual object based on preconfigured setting information (e.g., resolution, frame rate, brightness, and/or display area).

According to an embodiment, the electronic device 101 may operate the first display panel included in the first glass 220 and the second display panel included in the second glass 230 as independent components. For example, the electronic device 101 may determine the display performance of the first display panel based on first setting information, and may determine the display performance of the second display panel based on second setting information.

The number and position of one or more cameras (e.g., photographing camera 213, eye tracking camera 212, and/or recognition cameras 211-1 and 211-2) included in the electronic device 101 shown in FIGS. 2A, 2B and/or 2C may be not fixed. For example, the number and position of one or more cameras (e.g., photographing camera 213, eye tracking camera 212, and/or recognition cameras 211-1 and 211-2) may be variable according to the form (e.g., shape or size) of the electronic device 101.

Figure 3:
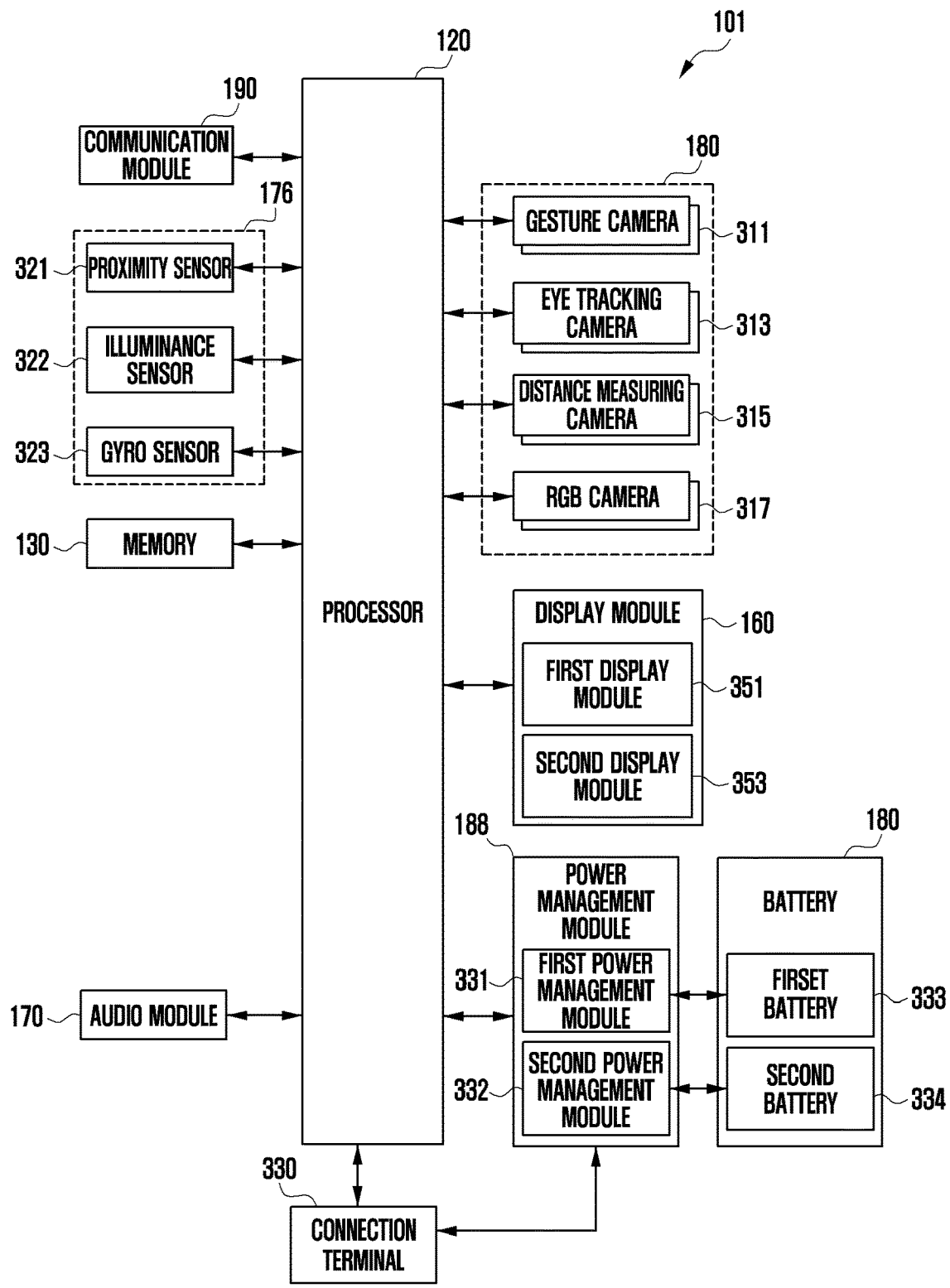
FIG. 3 is a block diagram of the electronic device for changing settings of the display panel according to certain embodiments of the disclosure.

FIG. 3 is a block diagram of the electronic device 101 (e.g., electronic device 101 in FIG. 1) for changing settings of the display panel according to certain embodiments of the disclosure.

With reference to FIG. 3, the electronic device 101 may include a processor 120 (e.g., processor 120 in FIG. 1), a memory 130 (e.g., memory 130 in FIG. 1), a display module 160 (e.g., display module 160 in FIG. 1), an audio module 170 (e.g., audio module 170 in FIG. 1), a sensor module 176 (e.g., sensor module 176 in FIG. 1), a camera module 180 (e.g., camera module 180 in FIG. 1), a power management module 188 (e.g., power management module 188 in FIG. 1), a battery 189 (e.g., battery 189 in FIG. 1), and/or a communication module (e.g., communication module 190 in FIG. 1). According to an embodiment, the electronic device 101 may be connected to an external electronic device (not shown) through a connection terminal 330 (e.g., USB Type- C). For example, the power management module 188 of the electronic device 101 may receive power from the external electronic device through the connection terminal 330 to charge the battery 189. As another example, the processor 120 of the electronic device 101 may perform power line communication with the external electronic device through the connection terminal 330. According to an embodiment, the electronic device 101 may include a body part (e.g., body part 223 in FIG. 2B) and support parts (e.g., first support part 221 and/or second support part 222 in FIG. 2B). According to an embodiment, the components of the electronic device 101 may be disposed on the body part 223 or the support parts 221 and 222.

According to an embodiment, the processor 120 may execute a program (e.g., program 140 in FIG. 1) stored in the memory 130 to control at least one other component (e.g., hardware or software component) and perform various data processing or operations. According to an embodiment, the processor 120 may provide an augmented reality service to the user. The processor 120 may output at least one virtual object through the display module 160 so that the at least one virtual object is viewed as being added to the real space corresponding to the field of view of the user wearing the electronic device 101.

According to an embodiment, the display module 160 of the electronic device 101 may include at least one glass (e.g., first glass (e.g., first glass 220 in FIG. 2A) and/or second glass (e.g., second glass in FIG. 2A)). According to an embodiment, the first glass 220 may include at least a portion of the first display module 351, and the second glass 230 may include at least a portion of the second display module 353. For example, the first display module 351 and/or the second display module 353 may each include a display panel. The display panel may be made of a transparent element so that the user can recognize the real space through the display module 160. The display module 160 may display at least one virtual object on at least a portion of the display panel so that the virtual object is viewed by the user wearing the electronic device 101 as being added to the real space. For example, the user's field of view may include an angle and/or a range at which the user can recognize things. According to an embodiment, the display module 160 may include a first display module 351 corresponding to the left eye and/or a second display module 353 corresponding to the right eye among both eyes of the user. According to an embodiment, the processor 120 may load setting information (e.g., resolution, frame rate, size of the display area, and/or sharpness) related to the performance of the display module 160 from the memory 130, and may adjust the performance of the display module 160 based on the setting information. According to an embodiment, setting information may be separately determined for each display panel included in the display module 160. For example, the first display panel corresponding to the left eye may be set based on first setting information, and the second display panel corresponding to the right eye may be set based on second setting information. According to another embodiment, the setting information may differently set at least a part of one display panel included in the display module 160. For example, the electronic device 101 may set the display module 160 differently in terms of at least one of resolution, frame rate, and/or sharpness. According to an embodiment, the electronic device 101 may reduce power consumption by at least partially changing the settings of the display module 160.

According to an embodiment, the audio module 170 may convert a sound into an electric signal or, conversely, convert an electric signal into a sound under the control of the processor 120. For example, the audio module 170 may include the speakers 232-1 and 232-2 in FIG. 2A and/or the microphone 241 in FIG. 2A.

According to an embodiment, the sensor module 176 of the electronic device 101 may include a proximity sensor 321, an illuminance sensor 322, and/or a gyro sensor 323. According to an embodiment, the proximity sensor 321 may detect an object in proximity to the electronic device 101. The illuminance sensor 322 may measure the degree of brightness around the electronic device 101. According to an embodiment, the processor 120 may check the brightness level around the electronic device 101 by using the illuminance sensor 322, and change the brightness related setting information of the display module 160 based on the brightness level. For example, if the surrounding brightness is higher than a preset brightness, the processor 120 may set the brightness level of the display module 160 to be higher so that the user's visibility is increased. According to an embodiment, the gyro sensor 323 may detect the posture and position of the electronic device 101. For example, the gyro sensor 323 may detect whether the electronic device 101 is properly worn on the user's head. As another example, the gyro sensor 323 may detect movement of the electronic device 101 or the user wearing the electronic device 101.

According to an embodiment, the electronic device 101 may perform wireless communication with another electronic device (e.g., electronic device 102 or 104 in FIG. 1) through the communication module 190 (e.g., wireless communication circuit). For example, the electronic device 101 may perform wireless communication with a portable electronic device (e.g., smartphone) and may exchange commands and/or data with each other. According to an embodiment, the electronic device 101 may be at least partially controlled by another external electronic device (e.g., portable electronic device). For example, the electronic device 101 may perform at least one function under the control of another external electronic device.

According to certain embodiments, the electronic device 101 may change at least some of the settings of the display panel based on the control of a different electronic device (e.g., electronic device 102 or 104 in FIG. 1) connected wirelessly and/or wiredly. According to an embodiment, the electronic device 101 may transmit dominant/non-dominant eye related information (e.g., information about the distance to an object located in the real space, user eye tracking information, user gesture information) obtained through the camera (e.g., camera module 180 in FIG. 1) of the electronic device 101 to a different electronic device. Based on the dominant/non-dominant eye related information received from the electronic device 101, the different electronic device may transmit setting information of the display panel included in the glass (e.g., first glass 220 and/or second glass 230) corresponding to the detected dominant eye or non-dominant eye to the electronic device 101. The electronic device 101 may change at least some of the settings of the display panel based on the setting information of the display panel received from the different electronic device. For example, the settings of the display panel may be changed to lower the quality of the display panel, and at least some of the settings may be changed so as not to be perceived by the user. According to an embodiment, the electronic device 101 may reduce the resolution of the display panel, reduce the frame rate, or adjust the size and position of the display area of the display panel.

According to an embodiment, the camera module 180 of the electronic device 101 may include a gesture camera 311, an eye tracking camera 313, a distance measuring camera (depth camera) 315, and/or an RGB camera 317. According to an embodiment, the gesture camera 311 may detect movement of the user. The recognition cameras 211-1 and 211-2 in FIG. 2A may include the gesture camera 311. For example, at least one gesture camera 311 may be disposed on the electronic device 101 and may detect a user's hand movement within a preset distance. The gesture camera 311 may include a simultaneous localization and mapping (SLAM) camera for recognizing information about the surrounding space (e.g., location and/or direction) of the electronic device 101. The gesture recognition area of the gesture camera 311 may be set based on a photographing range of the gesture camera 311. According to an embodiment, the eye tracking camera 313 (e.g., eye tracking camera 212 in FIG. 2A) may track the movement of the user's left eye and right eye. According to an embodiment, the processor 120 may identify the gaze direction of the left eye and the gaze direction of the right eye by using the eye tracking camera 313. For example, the eye tracking camera 313 may include a first eye tracking camera 212-1 for identifying the gaze direction of the left eye and a second eye tracking camera 212-2 for identifying the gaze direction of the right eye. According to an embodiment, the processor 120 may determine the dominant eye and the non-dominant eye based on the gaze direction of the left eye and the gaze direction of the right eye. According to an embodiment, the distance measuring camera 315 may measure the distance to an object located in front of the electronic device 101. The photographing camera 213 in FIG. 2A may include the distance measuring camera 315. The distance measuring camera 315 may include a time-of-flight (TOF) camera and/or a depth camera. According to an embodiment, the distance measuring camera 315 may photograph the front direction of the electronic device 101, and the eye tracking camera 313 may photograph a direction opposite to the photographing direction of the distance measuring camera 315. According to another embodiment, the electronic device 101 may measure the distance to an object by using the distance measuring camera 315, and may change the settings of the display panel when the distance is greater than or equal to a threshold value. For example, the electronic device 101 may maintain the display performance of the display panel when the distance to the object is near as being less than or equal to the threshold value. According to an embodiment, the electronic device 101 may recognize one of objects located in the gaze direction (e.g., FOV) in which the user is looking by using the eye tracking camera 313, and may calculate the distance to the corresponding object from a depth information obtained through the depth camera, or measure the distance to the corresponding object through the TOF camera. According to an embodiment, the red green blue (RGB) camera 317 may detect information about colors of an object and information about the distance to the object. According to an embodiment, the electronic device 101 may include one type of camera obtained by combining the distance measuring camera 315 and the RGB camera 317 together. For example, the photographing camera 213 in FIG. 2A may include a distance measuring camera 315 and/or an RGB camera 317. According to an embodiment, the gesture camera 311, the eye tracking camera 313, the distance measuring camera 315, and/or the RGB camera 317 included in the camera module 180 may each be separately included in the electronic device 101, or some of them may be implemented as an integrated camera. For example, the distance measuring camera 315 and the RGB camera 317 may be implemented as one integrated camera.

According to an embodiment, the power management module 188 may manage power supplied to the electronic device 101. The power management module 188 may include a plurality of power management modules (e.g., first power management module 331, second power management module 332). At least one of the first power management module 331 or the second power management module 332 may be directly connected to the processor 120 to supply power. At least one of the first power management module 331 or the second power management module 332 may receive power from an external electronic device through the connection terminal 330 (e.g., Type-C) to charge the battery 189 or supply power to other components of the electronic device 101. According to an embodiment, the electronic device 101 may charge the battery 189 by receiving power from an external electronic device through a wireless charging method. According to an embodiment, the power management module 188 may be electrically connected to the components (e.g., memory 130, display module 160, audio module 170, sensor module 176, camera module 180, and/or communication module 190) of the electronic device 101. For example, the power management module 188 may provide power from the battery 189 to the components of the electronic device 101 based on the control of the processor 120. According to an embodiment, the electronic device 101 may receive power from the first battery 333 through the first power management module 331, and may receive power from the second battery 334 through the second power management module 332. According to an embodiment, the processor 120 may manage power consumption by at least partially changing the settings of the display module 160 based on the information obtained using at least one of the cameras 311, 313, 315 and 317 included in the camera module 180.

According to an embodiment, the battery 189 may be charged by receiving power or be discharged by providing power, under the control of the power management module 188. According to an embodiment, the battery 189 may include a plurality of batteries (e.g., first battery 333, second battery 334). For example, the plural batteries (e.g., first battery 333, second battery 334) may be disposed on the body part 223 and the support parts (e.g., first support part 221 and/or second support part 222). According to an embodiment, the first battery 333 may be disposed on the first support part 221, and the second battery 334 may be disposed on the second support part 222.

According to certain embodiments, the electronic device 101 may include: a first camera (e.g., distance measuring camera 315 in FIG. 3) configured to capture a frontal external environment of the electronic device 101; a second camera (e.g., eye tracking camera 313 in FIG. 3) oriented opposite to the first camera and configured to capture the gaze direction of a user's left eye and right eye; a first display panel (e.g., first display module 351 in FIG. 3) corresponding to the left eye; a second display panel (e.g., second display module 353 in FIG. 3) corresponding to the right eye; a memory 130; and a processor 120 operably connected to the first camera 315, the second camera 313, the first display panel, the second display panel, and the memory 130. The processor 120 may be configured to identify the dominant eye and/or non-dominant eye among the left eye and right eye, identify a dominant display panel from among the first and second display panels corresponding to the dominant eye, and a non-dominant display panel from among the first and second display panels corresponding to the non-dominant eye, and change settings of the dominant display panel to be different from settings of the non-dominant display panel.

According to an embodiment, the processor 120 may be configured to identify the gaze direction of the user's left eye and the user's right eye by using at least one of the first camera 315 or the second camera 313, and identify the dominant eye and the non-dominant eye among the left eye and the right eye based on the captured gaze direction.

According to an embodiment, the processor 120 may be configured to measure the distance to an object using the first camera 315, identify the gaze direction of the user's left and right eyes by using the second camera 313 based on detecting that the measured distance exceeds a threshold value, and change at some of the settings of the non-dominant display panel corresponding to the non-dominant eye based on determining that the measured distance exceeds a threshold value.

According to an embodiment, the electronic device 101 may further include an illuminance sensor (e.g., illuminance sensor 322 in FIG. 3) to detect the ambient brightness, in which the processor 120 may be configured to identify whether the brightness value measured using the illuminance sensor 322 is less than or equal to a threshold value, and reduce a display resolution of the non-dominant display panel corresponding to the non-dominant eye based on determining that the brightness value is less than or equal to the threshold value.

According to an embodiment, the processor 120 may be configured to identify the movement of an object to which a gaze of the user is directed based on a direction of the gaze, identify whether the movement of the object exceeds a preset reference value, and reduce the frame rate of the non-dominant display panel corresponding to the non-dominant eye based on determining the movement exceeds the reference value.

According to an embodiment, the processor 120 may be configured to reduce one or more of a resolution and a frame rate of the non-dominant display panel corresponding to the non-dominant eye, based on a preset time interval.

According to an embodiment, the processor 120 may be configured to detect eye the movement of the left eye and the right eye, determine whether the detected eye movement exceeds a preset reference value, and reduce the display area of the non-dominant display panel corresponding to the non-dominant eye based on determining that the eye movement exceeds the reference value.

According to an embodiment, the processor 120 may be configured to display a virtual object on the first display panel and the second display panel, and identify the gaze direction of the left eye and the gaze direction of the right eye, as the user gazes at an object through the displayed virtual object using the second camera, and wherein the non-dominant eye is identified from among the left eye and the right eye based on the identified left eye and right eye gaze directions.

According to an embodiment, the electronic device 101 may further include a third camera (e.g., gesture camera 311 in FIG. 3) to detect a user's gesture, such that the processor 120 may be configured to detect the position of the user's hand using the third camera, as the user's hand forms a circle, identify the gaze direction of the left eye and the gaze direction of the right eye as the user gazes at an object through the circle, using the second camera, and wherein the non-dominant eye is identified from among the left eye and the right eye based on the identified left eye and right eye gaze directions.

According to an embodiment, the processor 120 may be configured to determine whether the dominant eye is changed based on detection of the gaze direction of the left eye and the gaze direction of the right eye, and based on determining that the dominant eye has been changed from the right eye to the left eye, change at least some of the settings of the display panel corresponding to the right eye, or revert the settings of the display panel corresponding to the left eye to initial settings.

Figure 4:
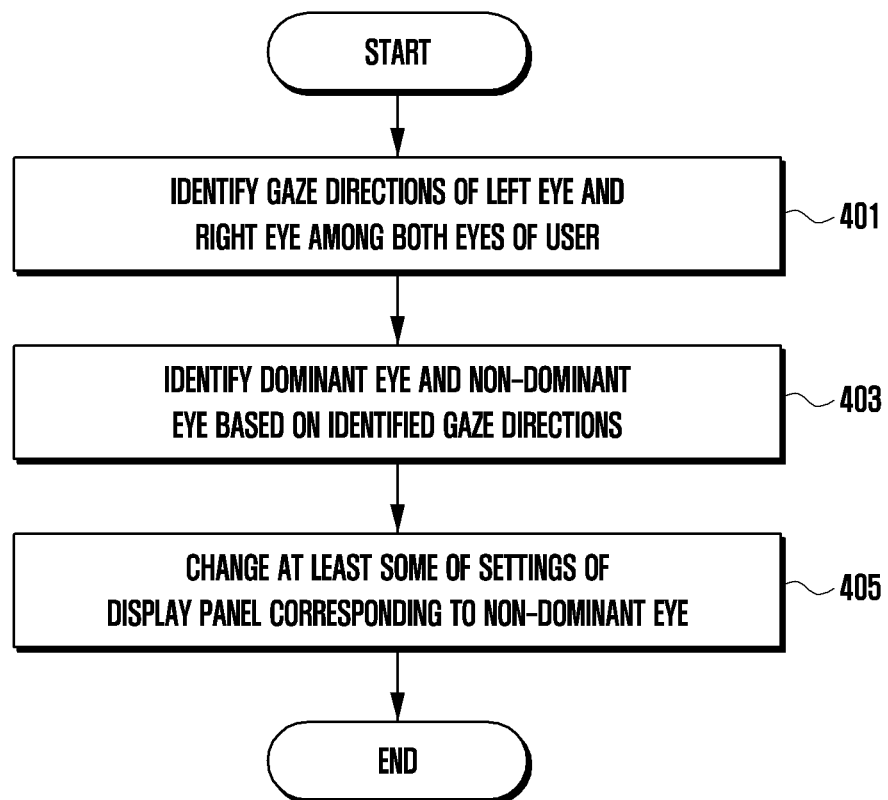
FIG. 4 is a flowchart illustrating a method for changing settings of the display panel corresponding to the non-dominant eye according to certain embodiments of the disclosure.

FIG. 4 is a flowchart illustrating an example method for changing settings of a non-dominant display panel corresponding to the non-dominant eye, according to certain embodiments of the disclosure. Operations in the following embodiment may be performed in sequence, but are not necessarily performed in sequence. For example, the order of operations may be changed, and at least two operations may be performed in parallel. According to an embodiment, the electronic device in FIG. 4 may include the electronic device 101 in FIG. 1 or the electronic device 101 in FIG. 2.

According to an embodiment, the example electronic device (e.g., electronic device 101 in FIG. 1) may include at least two display panels each corresponding respectively to both eyes of the user, and may be mounted/worn on the user's head (e.g., to produce a stereoscopic effect). The electronic device 101 may include a display module (e.g., display module 160 in FIG. 1), and the display module 160 may include at least one display panel. For example, the display module 160 may include a first display module (e.g., first display module 351 in FIG. 3) corresponding to the user's left eye, and a second display module (e.g., second display module 353 in FIG. 3) corresponding to the user's right eye. The first display module 351 may include a first display panel, and the second display module 353 may include a second display panel. According to an embodiment, the display module 160 of the electronic device 101 may include at least one display driver IC (DDI). For example, it may include a first DDI corresponding to the first display panel and a second DDI corresponding to the second display panel, or the first display panel and the second display panel may be driven by one DDI. The display panel may be made of a transparent element so that the user can perceive the real space through the display panel.

According to an embodiment, the processor (e.g., processor 120 in FIG. 1) may display at least one virtual object based on the display panel so that the virtual object is viewed as being added to the real space. The electronic device 101 may include an AR glass device, and the display panel may be a component corresponding to a lens of the AR glass device. According to an embodiment, the lens of the AR glass device may include a waveguide for providing the virtual object displayed by the display module 160 to the user. For example, the lens of the AR glass device may include a first waveguide for transmitting the image displayed on the first display panel to the left eye of the user, and a second waveguide for transmitting the image displayed on the second display panel to the right eye of the user. According to an embodiment, the waveguide (e.g., first waveguide and/or second waveguide) may be made of a transparent element so that the user can perceive the real space through the waveguide.

According to an embodiment, the electronic device 101 may include an eye tracking camera (e.g., eye tracking camera 313 in FIG. 3) for tracking the user's gaze direction, and a distance measuring camera (e.g., distance measuring camera 315 in FIG. 3) for measuring the distance to an object. There may be a plurality of eye tracking cameras 313 corresponding respectively to both eyes of the user. For example, the eye tracking camera 313 may include a first eye tracking camera corresponding to the user's left eye and a second eye tracking camera corresponding to the user's right eye. According to an embodiment, the eye tracking camera 313 may sense reflection light reflected by the user's eye based on the control of the processor 120. The eye tracking camera 313 may convert the sensed reflection light into an electrical signal. The processor 120 may obtain the user's eyeball image through the converted electrical signal. The processor 120 may track the user's gaze by using the obtained eyeball image of the user. For example, the processor 120 may track the user's gaze based on the position and movement of the reflection light sensed by the eye tracking camera 313.

The first eye tracking camera may track the gaze direction of the left eye, and the second eye tracking camera may track the gaze direction of the right eye. In general, when the user gazes at a specific object, one eye that accurately gazes at the object may be referred to as a dominant eye, and the other eye other than the dominant eye may be referred to as a non-dominant eye. According to an embodiment, the electronic device 101 may identify the gaze directions of the left and right eyes by using the eye tracking camera 313, and may distinguish the dominant eye from the non-dominant eye among both of the user's eyes based on the identified gaze directions.

At operation 401, the processor (e.g., processor 120 in FIG. 1) of the electronic device 101 may identify the respective gaze directions of the left eye and the right eye of the user, using at least one camera (e.g., camera module 180 in FIG. 3). For example, the processor 120 may detect the gaze directions of the left eye and the right eye using the eye tracking camera 313 included in the camera module 180. According to an embodiment, the processor 120 may calculate a distance to an object located in the external environment using at least one distance measuring camera, and may detect a direction of the user's gaze using at least one eye tracking camera. When the user gazes at the object located at a front of the device, the processor 120 may determine which eye is dominant in the gaze, from among the user's left eye and the right eye.

At operation 403, the processor 120 may identify the dominant eye and/or the non-dominant eye from among the left eye and/or right eye of the user, based on the identified gaze directions. For example, the dominant eye may be mainly used when the user gazes at the object, and the non-dominant eye may refer to an eye that is supplementally used to gaze at the object. The dominant eye and non-dominant eye of the user may be identified through examination or testing, and the user may be notified of their dominant eye and non-dominant eye. According to an embodiment, when the user perceives real space (e.g., the external environment), perception may be based on the field of view of the dominant eye.

At operation 405, the processor 120 may change at least some of the settings of the display panel corresponding to the non-dominant eye. For example, when gazing at a specific object, the gaze primarily uses the dominant eye, and so the display performance of the dominant-eye display panel (e.g., corresponding to the dominant eye) may affect the user's perceptive ability. On the other hand, the display performance of the non-dominant-eye display panel (e.g., corresponding to the non-dominant eye) may have relatively less influence on the user's perceptive ability. According to an embodiment, the processor 120 may change at least some of the settings of the non-dominant display panel corresponding to the user's non-dominant eye, which in turn may reduce the amount of power consumed by the non-dominant display panel corresponding to the user's non-dominant eye. According to an embodiment, the processor 120 may change the settings of the display panel corresponding to the non-dominant eye at a level that is imperceptible to the user. For example, the processor 120 may lower the resolution of the display panel corresponding to the non-dominant eye and/or lower the frame rate displayed through the display panel. As another example, the processor 120 may reduce the size of the display area of the display panel corresponding to the non-dominant eye. According to an embodiment, the processor 120 may change the settings of the display panel corresponding to the non-dominant eye to be at least partially different from the settings of the display panel corresponding to the dominant eye. According to an embodiment, the processor 120 may change the settings of the display panel based on hardware or may change the settings of the display panel based on software (e.g., application program).

Figure 5:
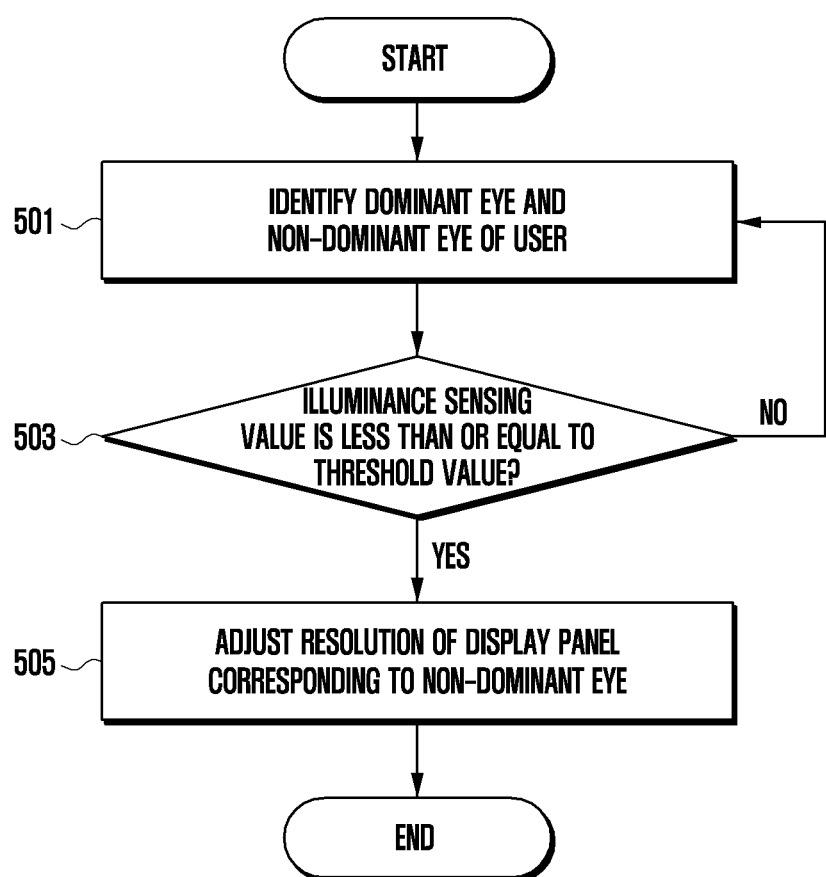
FIG. 5 is a flowchart illustrating a method for adjusting the resolution of the display panel corresponding to the non-dominant eye according to certain embodiments of the disclosure.

FIG. 5 is a flowchart illustrating an example method for adjusting the resolution of the display panel corresponding to the non-dominant eye according to certain embodiments of the disclosure. According to an embodiment, the processor (e.g., processor 120 in FIG. 1) of the electronic device (e.g., electronic device 101 in FIG. 1) may lower the resolution of the display panel corresponding to the non-dominant eye to reduce power consumption of the display panel corresponding to the non-dominant eye.

At operation 501, the processor 120 may identify the dominant eye and non-dominant eye of the user. Operation 501 may include substantially the same process as operation 403 in FIG. 4. According to an embodiment, the processor 120 may identify the user's dominant eye and non-dominant eye based on information about the dominant eye and the non-dominant eye stored in the memory (e.g., memory 130 in FIG. 1) or based on direct user input. For example, the processor 120 may provide a user interface through which the user may input information about the dominant eye and the non-dominant eye. The processor 120 may identify the user's dominant eye and non-dominant eye based on the information input to the user interface. According to an embodiment, the electronic device 101 may include a sensor (e.g., bio-signal processing sensor) capable of obtaining at least one piece of biometric information (e.g., heart rate, oxygen saturation, blood pressure, and/or blood sugar). For example, the processor 120 may obtain information about the dominant eye and non-dominant eye set by the user based on at least one piece of biometric information obtained by the sensor (e.g., bio-signal processing sensor). According to an embodiment, the processor 120 may identify the gaze direction corresponding to both eyes of the user by using at least one camera (e.g., eye tracking camera) included in the electronic device 101, and identify the user's dominant eye and non-dominant eye based on the identified gaze direction.

According to an embodiment, the processor 120 may obtain context information by using the sensor module (e.g., sensor module 176 in FIG. 1). At operation 503, the processor 120 may detect the brightness of the environment of the electronic device 101 using the illuminance sensor (e.g., illuminance sensor 322 in FIG. 3). The processor 120 may obtain an illuminance sensing value indicating the level of ambient brightness from the sensor module 176, and may determine whether the illuminance sensing value is less than or equal to a threshold value. According to an embodiment, when the level of brightness around the electronic device 101 becomes high, the processor 120 may increase the resolution of the display device (e.g., display module 160 in FIG. 1) to secure user visibility. According to an embodiment, when the level of brightness around the electronic device 101 becomes low, the processor 120 may decrease the resolution of the display panel corresponding to the non-dominant eye. According to an embodiment, the processor 120 may perform operation 505 if the illuminance sensing value is less than or equal to the threshold value, and may perform operation 501 according to a period or an event occurrence (e.g., a change in at least one object displayed on the display module 160) if the illuminance sensing value is greater than or equal to the threshold value.

At operation 505, the processor 120 may reduce the display resolution of the non-dominant display panel corresponding to the non-dominant eye. For example, the processor 120 may reduce the resolution of the display panel to a degree that the reduction cannot readily be perceived by the user. The processor 120 may lower the resolution of the display panel corresponding to the user's non-dominant eye, thereby reducing power consumption according to the driving of the display panel. For example, the change (or modification) of the display panel corresponding to the non-dominant eye may be set to a level that is imperceptible to the user.

According to an embodiment, the processor 120 may obtain an illuminance sensing value from the sensor module 176, and may lower both the resolution of the display panel corresponding to the dominant eye and the resolution of the display panel corresponding to the non-dominant eye if the illuminance sensing value is less than or equal to a first threshold value. The processor 120 may adjust the resolution of the display panel corresponding to the non-dominant eye to be lower than the resolution of the display panel corresponding to the dominant eye. For example, it may adjust the resolution of the display panel corresponding to the dominant eye based on the illuminance sensing value, and may adjust the resolution of the display panel corresponding to the non-dominant eye to be lower than the resolution of the display panel corresponding to the dominant eye.

According to an embodiment, the electronic device 101 may lower the resolution of the display panel to a level that the user may not recognize, and may reduce power consumption due to the display panel. The usage time of the electronic device 101 may increase, and heat generation due to the driving of the display panel may be reduced.

FIG. 6 is a table depicting a method for adjusting the resolution of the display panel corresponding to the non-dominant eye according to certain embodiments of the disclosure.

FIG. 6 illustrates Table [a] and Table [b] showing the resolution setting information of the display panel when the user's left eye 601 is the dominant eye and the user's right eye 603 is the non-dominant eye. The electronic device (e.g., electronic device 101 in FIG. 1) may lower the resolution of the display panel corresponding to the non-dominant eye (e.g., right eye).

With reference to Table [a] and Table [b], the electronic device 101 may change the resolution of the display panel corresponding to the dominant eye or the display panel corresponding to the non-dominant eye based on a preset time interval (e.g., 1 second (s)). With reference to Table [a], the processor (e.g., processor 120 in FIG. 1) of the electronic device 101 may maintain an image quality of FHD for the first display panel corresponding to the left eye being the dominant eye, and may alternately change the image quality between FHD and HD for the second display panel corresponding to the non-dominant eye (611). For example, the processor 120 may change the resolution of the second display panel to FHD or HD based on a set time interval (e.g., 1 second (s)). According to an embodiment, changes in image quality between FHD and HD may be made at a level below the user's awareness. For example, the time interval and the degree of change in resolution may be set according to user perception (e.g., sensation). Accordingly, even if the electronic device 101 changes the resolution of the second display panel corresponding to the non-dominant eye according to the preset time interval, it may be imperceptible to the user. With reference to Table [b], the processor 120 may maintain an image quality of FHD for the first display panel corresponding to the left eye being the dominant eye, and maintain an image quality of HD for the second display panel corresponding to the non-dominant eye (613).

According to certain embodiments, the degree of change in time interval and resolution may have a plurality of settings. For example, the processor 120 may divide the resolution of the display panel corresponding to the dominant eye and the display panel corresponding to the non-dominant eye into multiple levels, and change it at multiple levels. As another example, the processor 120 may set different time intervals (e.g., period (time interval), time to change from FHD to HD and/or time to change from HD to FHD) for changing the resolution of the display panel corresponding to the non-dominant eye.

According to an embodiment, the electronic device 101 may reduce power consumption due to the display panel by setting the resolution of the display panel corresponding to the non-dominant eye to be low. The electronic device 101 may adjust the resolution to be lower at a level that the user may not recognize.

Figure 7:
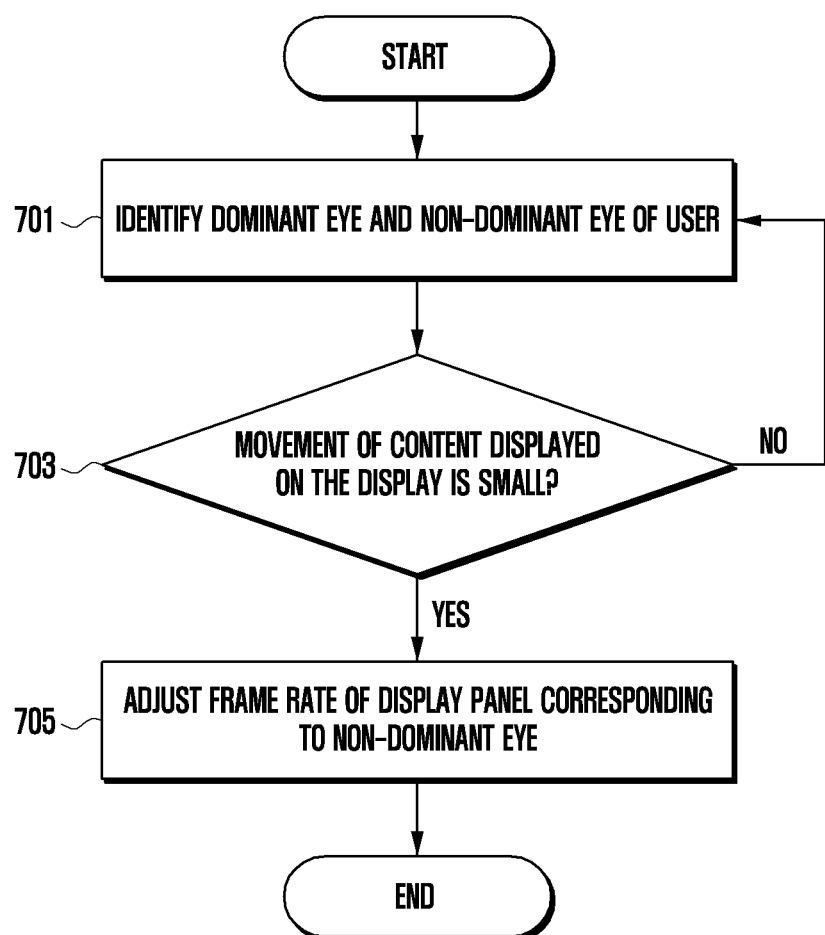
FIG. 7 is a flowchart illustrating a method for adjusting the frame rate of the display panel corresponding to the non-dominant eye according to certain embodiments of the disclosure.

FIG. 7 is a flowchart illustrating a method for adjusting the frame rate of the display panel corresponding to the non-dominant eye according to certain embodiments of the disclosure. According to an embodiment, the processor (e.g., processor 120 in FIG. 1) of the electronic device (e.g., electronic device 101 in FIG. 1) may decrease the frame rate of the display panel to thereby lower the display performance of the display panel.

At operation 701, the processor 120 may identify the user's dominant eye and non-dominant eye. Operation 701 may include substantially the same process as operation 403 in FIG. 4. According to an embodiment, the processor 120 may identify the user's dominant eye and non-dominant eye based on information about the dominant eye and the non-dominant eye stored in the memory (e.g., memory 130 in FIG. 1) or based on direct user input. According to an embodiment, the processor 120 may identify the gaze direction corresponding to both eyes of the user by using at least one camera included in the electronic device 101, and identify the user's dominant eye and non-dominant eye based on the identified gaze direction.

At operation 703, the processor 120 may detect a movement of an object that the user is gazing at, using at least one camera. For example, the object the user is gazing at may include a virtual object displayed on the display module (e.g., display module 160 in FIG. 1), that is based on a real object. For example, the processor 120 may identify the level of movement of the object by comparing the movement of the object with preset movement-related information. The processor 120 may determine whether the object moves more or less than a set movement level. For example, if the movement of the object is below a preset threshold, the movement of the region where the user gazes may also be small, and even if the display performance of the display panel corresponding to the non-dominant eye is adjusted to be low, it may be imperceptible to the user. According to an embodiment, the electronic device 101 may lower the display performance of the display panel corresponding to the non-dominant eye within a level that is imperceptible to the user. According to an embodiment, the processor 120 may perform operation 705 if the movement of the content displayed on the display is less than or equal to a threshold value, and may perform operation 701 according to a period or an event occurrence (e.g., a change in at least one object being displayed on the display) if the movement of the content displayed on the display is greater than or equal to the threshold value.

At operation 705, the processor 120 may adjust the frame rate of the display panel corresponding to the non-dominant eye. For example, when the movement of the object the user is gazing at among at least one object being displayed on the display is below a preset threshold, the processor 120 may reduce the frame rate of the display panel. The reduction in frame rate may be set to a level that is imperceptible to the user. The processor 120 may decrease the frame rate of the display panel corresponding to the user's non-dominant eye, thereby reducing power consumption due to the driving of the display panel. For example, the change in display performance of the display panel corresponding to the non-dominant eye may be set to a level that is imperceptible to the user.

According to an embodiment, when the movement of the object the user is gazing at among the at least one object being displayed on the display is less than or equal to a first threshold value, the processor 120 may lower both the frame rate of the display panel corresponding to the dominant eye and the frame rate of the display panel corresponding to the non-dominant eye. The processor 120 may adjust the frame rate of the display panel corresponding to the non-dominant eye to be lower than the frame rate of the display panel corresponding to the dominant eye. According to another embodiment, when the movement of the object the user is gazing at among the at least one object being displayed on the display is greater than the first threshold value and less than or equal to a second threshold value, the processor 120 may set the frame rate of the display panel corresponding to the non-dominant eye to be lower than the frame rate of the display panel corresponding to the dominant eye.

According to an embodiment, the electronic device 101 may lower the frame rate of at least some of the display panels at a level that is imperceptible to the user, and reduce power consumption due to the display panel. The usage time of the electronic device 101 may increase, and heat generation due to the driving of the display panel may be reduced.

FIG. 8 is a table depicting a method for adjusting the frame rate of the display panel corresponding to the non-dominant eye according to certain embodiments of the disclosure.

FIG. 8 illustrates Table [a] and Table [b] showing the frame rates of the display panels when the user's left eye 801 is the dominant eye and the user's right eye 803 is the non-dominant eye. The electronic device (e.g., electronic device 101 in FIG. 1) may lower the frame rate of the display panel corresponding to the non-dominant eye (e.g., right eye).

With reference to Table [a] and Table [b], the electronic device 101 may change the frame rate of each display panel based on a preset time interval (e.g., 1 second (s)). With reference to Table [a], the processor (e.g., processor 120 in FIG. 1) of the electronic device 101 may maintain a first frame rate (e.g., about 120 Hz) for the first display panel corresponding to the left eye being the dominant eye, and may alternately change the frame rate between the first frame rate (e.g., about 120 Hz) and a second frame rate (e.g., about 60 Hz) for the second display panel corresponding to the non-dominant eye (811). For example, the processor 120 may change the frame rate of the second display panel from about 120 Hz to about 60 Hz based on a set time interval (e.g., 1 second (s)). According to an embodiment, the change of the frame rate may be made at a level that is imperceptible to the user. For example, the time interval and the degree of change of the frame rate may be determined based on the user's level of perception (e.g., sensation). According to an embodiment, even if the electronic device 101 changes the second frame rate of the second display panel corresponding to the non-dominant eye according to a preset time interval, it may be imperceptible to the user. With reference to Table [b], the processor 120 may maintain the first frame rate (e.g., about 120 Hz) for the first display panel corresponding to the left eye being the dominant eye, and maintain the second frame rate (e.g., about 60 Hz) for the second display panel corresponding to the non-dominant eye (813).

According to certain embodiments, the change in time interval and frame rate may have a plurality of settings. For example, the processor 120 may divide the frame rate of the display panel corresponding to the dominant eye and the display panel corresponding to the non-dominant eye into three or more levels such as 60 Hz, 120 Hz and 144 Hz, and change it at those levels. As another example, the processor 120 may set different time intervals (e.g., time to change from 60 Hz to 120 Hz and/or time to change from 120 Hz to 60 Hz) for changing the frame rate of the display panel corresponding to the non-dominant eye. According to an embodiment, the frame rate of the display panel corresponding to the non-dominant eye may be changed by selecting one of plural frame rate settings based on the speed of movement of the object the user is gazing at among at least one object being displayed on the display.

According to an embodiment, the electronic device 101 may reduce power consumption due to the display panel by setting the frame rate of the display panel corresponding to the non-dominant eye to be low. The electronic device 101 may adjust the frame rate to be lower at a level that the user may not recognize.

Figure 9:
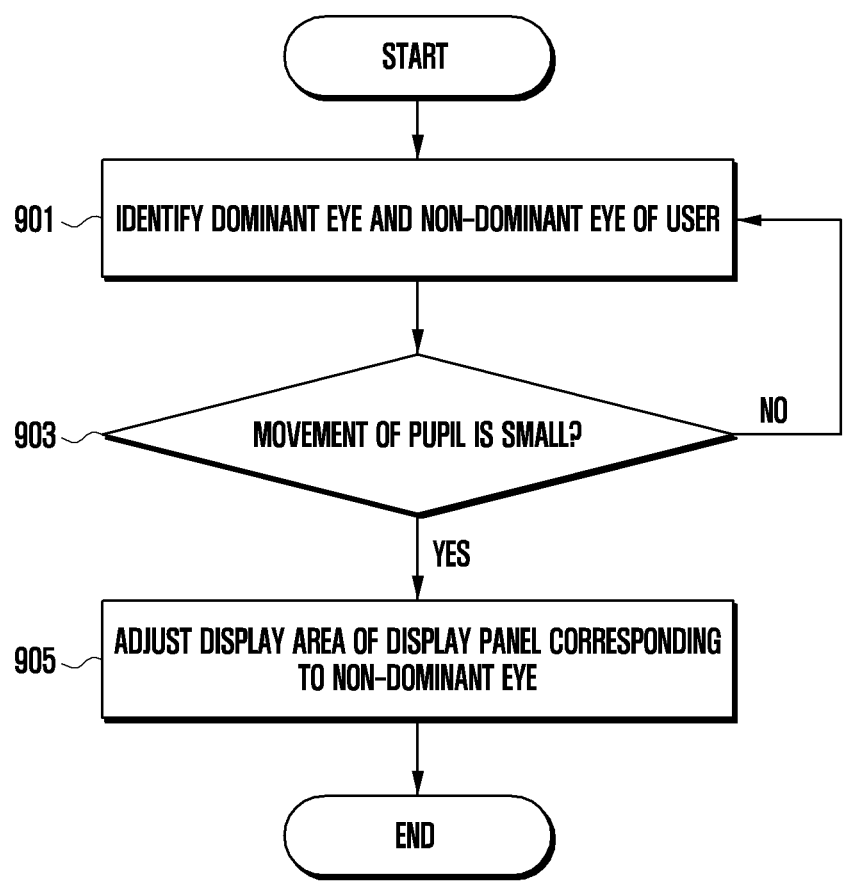
FIG. 9 is a flowchart illustrating a method for adjusting the display area of the display panel corresponding to the non-dominant eye according to certain embodiments of the disclosure.

FIG. 9 is a flowchart illustrating a method for adjusting the display area of the display panel corresponding to the non-dominant eye according to certain embodiments of the disclosure. According to an embodiment, the processor (e.g., processor 120 in FIG. 1) of the electronic device (e.g., electronic device 101 in FIG. 1) may reduce the power consumption of the display panel by reducing the size of the display area of the display panel.

At operation 901, the processor 120 may identify the user's dominant eye and non-dominant eye. Operation 901 may include substantially the same process as operation 403 in FIG. 4. According to an embodiment, the processor 120 may identify the user's dominant eye and non-dominant eye based on information about the dominant eye and the non-dominant eye stored in the memory (e.g., memory 130 in FIG. 1) or based on direct user input. According to an embodiment, the processor 120 may identify the gaze direction corresponding to both eyes of the user by using at least one camera (e.g., eye tracking camera (e.g., eye tracking camera 313 in FIG. 3)) included in the electronic device 101, and identify the user's dominant eye and non-dominant eye based on the identified gaze direction.

At operation 903, the processor 120 may detect a movement of the user's pupils (e.g., left eye and right eye) by using at least one camera (e.g., eye tracking camera 313). For example, the processor 120 may identify the level of movement of the user's eyes by comparing the pupil movement with preset pupil movement related information. The processor 120 may determine whether the pupil moves more or less than a set movement level. For example, when the movement of the pupil is below a preset threshold, the movement of the region where the user gazes may also be small, and even if the size of the display area of the display panel corresponding to the non-dominant eye is adjusted to be small, it may be imperceptible to a user. According to an embodiment, the electronic device 101 may reduce the size of the display area of the display panel corresponding to the non-dominant eye within a level that is imperceptible to the user. According to an embodiment, the processor 120 may perform operation 905 if the movement of the user's pupil (e.g., left eye and/or right eye) detected using at least one camera (e.g., eye tracking camera 313) is below a specified level or threshold, and may perform operation 901 according to a period or an event occurrence (e.g., a change in at least one object displayed on the display) if the movement of the user's pupil (e.g., left eye and/or right eye) is higher than or equal to the specified level or threshold.

At operation 905, the processor 120 may reduce the size of the display area of the display panel corresponding to the non-dominant eye. For example, the processor 120 may reduce the display area of the display panel by a degree that is imperceptible to the user. The processor 120 may thus reduce the amount of power consumed due to the driving of the display panel, by reducing the size of the display area of the display panel corresponding to the user's non-dominant eye. For example, the reduction of the size of the display area of the display panel corresponding to the non-dominant eye may be set to a level that is imperceptible by the user. According to an embodiment, when the movement of the user's pupil detected using at least one camera (e.g., eye tracking camera 313) is less than or equal to a first threshold value, the processor 120 may reduce both the display area of the display panel corresponding to the dominant eye and the display area of the display panel corresponding to the non-dominant eye. According to another embodiment, when the movement of the user's pupil is greater than or equal to a second threshold value greater than the first threshold value, the processor 120 may set the display area of the display panel corresponding to the dominant eye to be the same as the display area of the display panel corresponding to the non-dominant eye. According to another embodiment, when the movement of the user's pupil is greater than the first threshold value and less than the second threshold value, the processor 120 may set the display area of the display panel corresponding to the non-dominant eye to be smaller than the display area of the display panel corresponding to the dominant eye.

According to an embodiment, the electronic device 101 may reduce the display area of the display panel at a level that is imperceptible to the user, and reduce power consumption due to the display panel. The usage time of the electronic device 101 may increase, and heat generation due to the driving of the display panel may be reduced.

According to an embodiment, when the user's pupil (or gaze) deviates from the display area of the display panel corresponding to the non-dominant eye being set smaller than the display area of the display panel corresponding to the dominant eye, the electronic device 101 may set the display area of the display panel corresponding to the non-dominant eye to be the same as the display area of the display panel corresponding to the dominant eye. For example, the electronic device 101 may check whether the user's pupil (or gaze) deviates from the display area of the display panel corresponding to the non-dominant eye by using at least one camera (e.g., eye tracking camera 313).

Figure 10A:
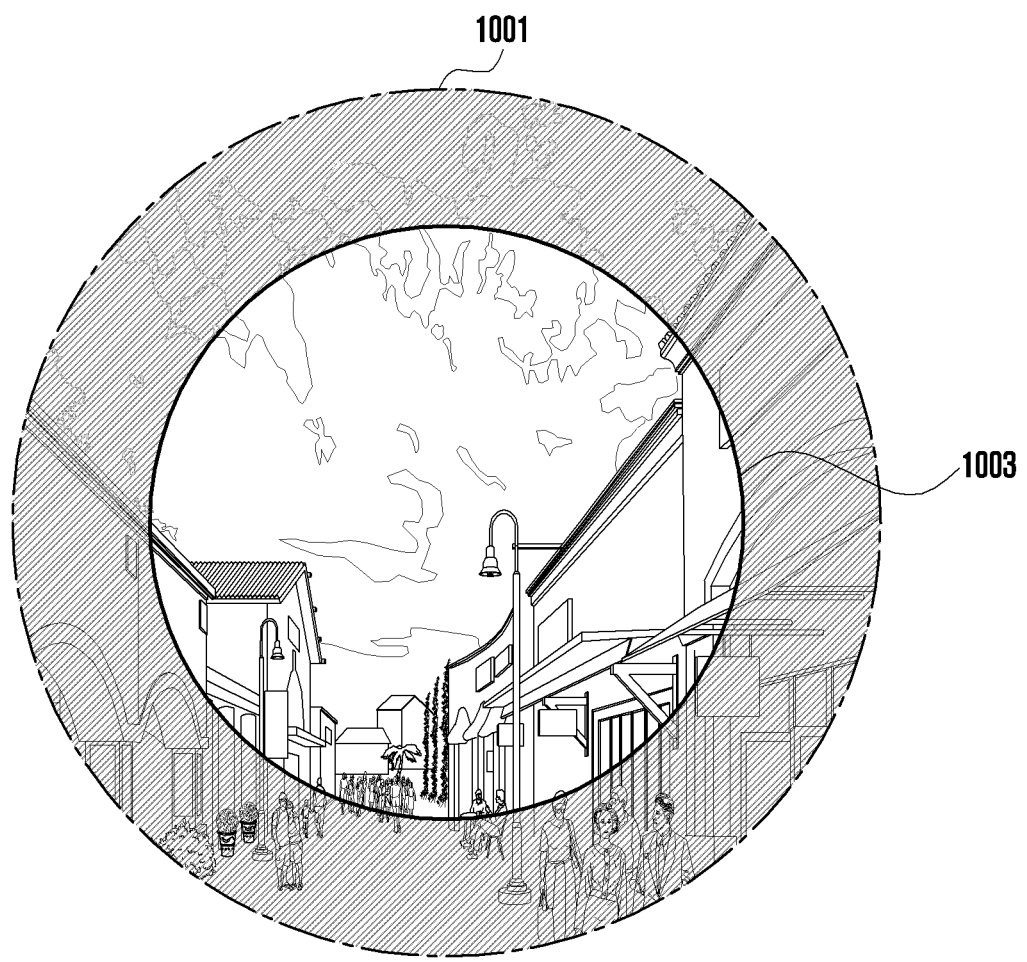
FIG. 10A is a first illustrative diagram depicting a method for adjusting the display area of the display panel corresponding to the non-dominant eye according to certain embodiments of the disclosure.
Figure 10B:
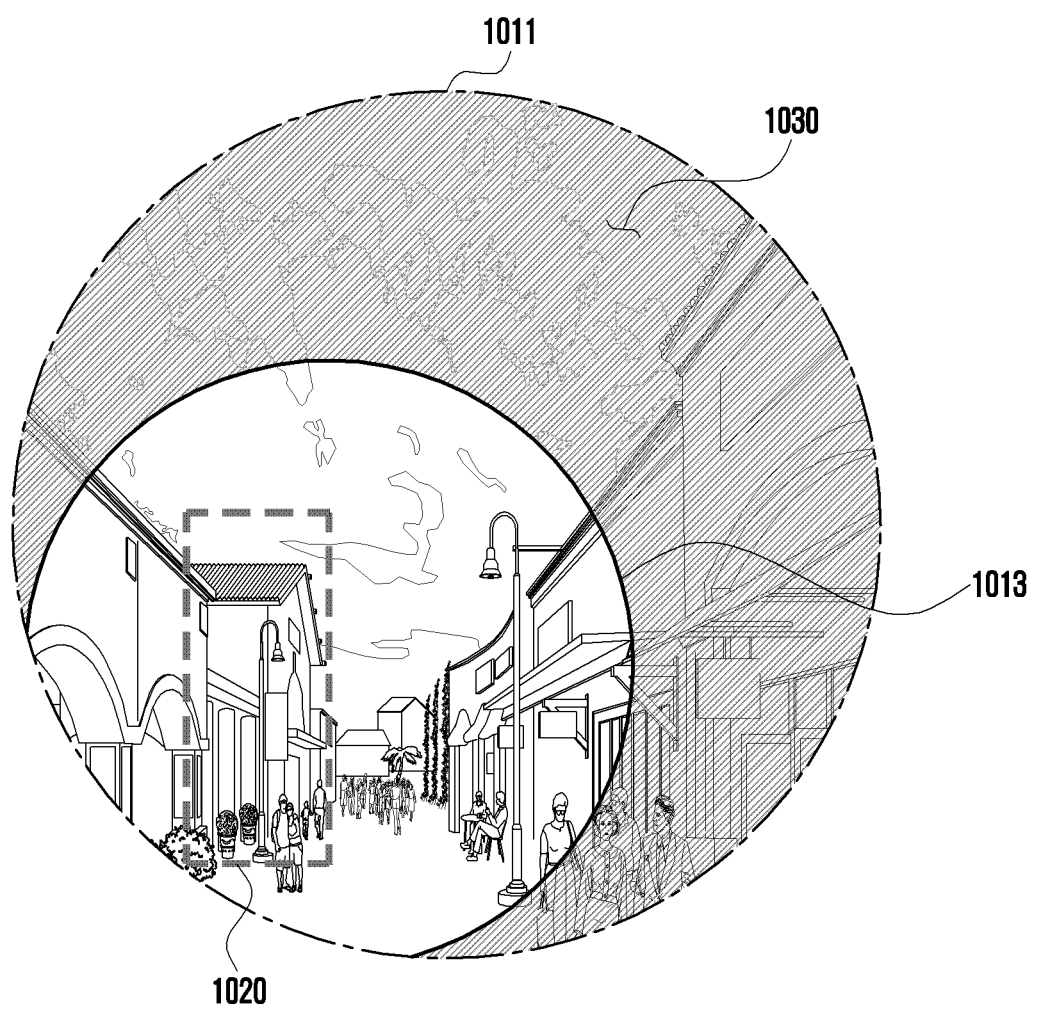
FIG. 10B is a second illustrative diagram depicting a method for adjusting the display area of the display panel corresponding to the non-dominant eye according to certain embodiments of the disclosure.

FIGS. 10A and 10B are illustrative diagrams depicting a method of adjusting the display area of the display panel corresponding to the non-dominant eye according to certain embodiments of the disclosure. FIG. 10A illustrates a first embodiment in which the size of the display area of the display panel is reduced with respect to the center-point. FIG. 10B illustrates a second embodiment in which the size of the display area of the display panel is reduced with respect to the user's gaze direction.

With reference to FIG. 10A, the processor (e.g., processor 120 in FIG. 1) of the electronic device (e.g., electronic device 101 in FIG. 1) may reduce the size of the display area of the display panel corresponding to the user's non-dominant eye. For example, the processor 120 may reduce the size from a first display area 1001 to a second display area 1003. The processor 120 may reduce the display area from the first display area 1001 to the second display area 1003 with respect to the center-point thereof. According to an embodiment, the first display panel corresponding to the dominant eye may display a surrounding background based on the first display area 1001, and the second display panel corresponding to the non-dominant eye may display a surrounding background based on the second display area 1003. For example, the region between the first display area 1001 and the second display area may be processed to have a lower resolution, may be blurred, or may be displayed as a black screen. According to an embodiment, the processor 120 of the electronic device 101 may reduce the size of the display area of the display panel at a level that is imperceptible to the user, and may reduce power consumption due to the display panel. According to an embodiment, based on the movement of the user's eye, the processor 120 may also adjust the size of the display area of the first display panel corresponding to the dominant eye in correspondence to the size of the display area of the second display panel corresponding to the non-dominant eye. The size of the display area of the second display panel corresponding to the non-dominant eye may be adjusted to be smaller than the size of the display area of the first display panel corresponding to the dominant eye.

With reference to FIG. 10B, the processor 120 of the electronic device 101 may reduce the size of the display area of the display panel corresponding to the user's non-dominant eye. For example, the processor 120 may reduce the size from a first display area 1011 to a second display area 1013. The processor 120 may identify an object 1020 at which the user is gazing (or a direction in which the user is gazing), and set the identified object 1020 as the center-point for the reduction. The processor 120 may reduce the size of the display area from the first display area 1011 to the second display area 1013 with respect to the object 1020 set as the center-point. According to an embodiment, the first display module (e.g., first display module 351 in FIG. 3) corresponding to the dominant eye may display a surrounding background based on the first display area 1011, and the second display module (e.g., second display module 353 in FIG. 3) corresponding to the non-dominant eye may display a surrounding background based on the second display area 1013. For example, the region 1030 between the first display area 1001 and the second display area may be processed to have a lower resolution, may be blurred, or may be displayed as a black screen. According to an embodiment, the processor 120 of the electronic device 101 may reduce the size of the display area of the display panel at a level that is imperceptible to the user, and may reduce power consumption due to the display panel.

The display areas of the first display panel and the second display panel are shown as a circle in the examples of FIGS. 10A and 10B, but according to certain embodiments, the shape of the display area may vary according to the shape of the display panel or the shape of the lens of the electronic device 101. For example, the display area may include a triangle, a quadrangle, a pentagon, or a polygon.

Figure 11:
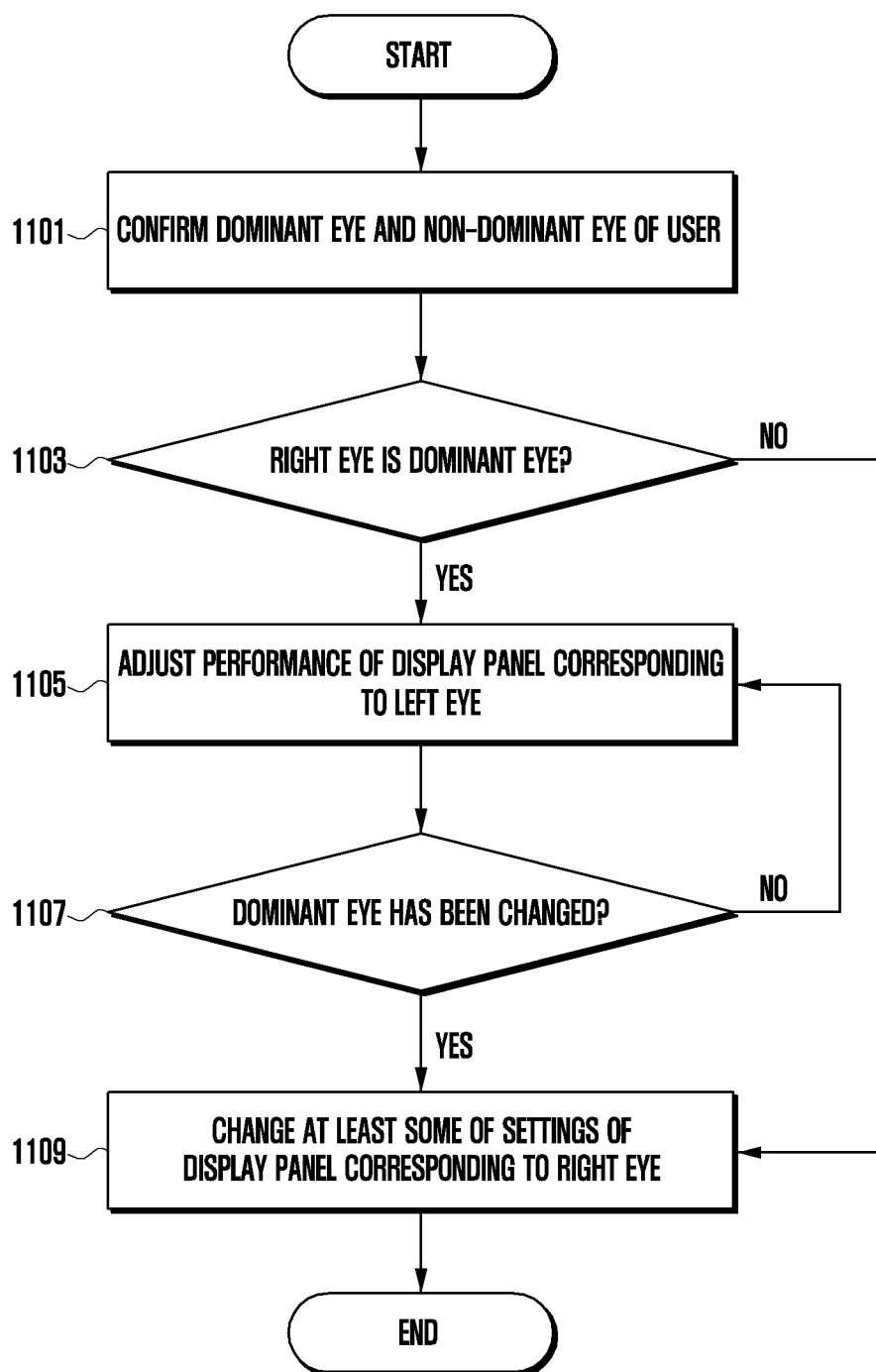
FIG. 11 is a flowchart illustrating a method for checking a change of the non-dominant eye and changing settings of the display panel corresponding to the changed non-dominant eye according to certain embodiments of the disclosure.

FIG. 11 is a flowchart illustrating a method for checking a change of the non-dominant eye and changing settings of the display panel corresponding to the changed non-dominant eye according to certain embodiments of the disclosure. According to an embodiment, the processor (e.g., processor 120 in FIG. 1) of the electronic device (e.g., electronic device 101 in FIG. 1) may check the user's field of view periodically or when an event occurs (e.g., when at least one object displayed on the display panel changes), and may, when the dominant eye (or non-dominant eye) is changed according to a change of the field of view, change the display panel whose display performance is to be adjusted. At operation 1101, the processor 120 may identify the user's dominant eye and non-dominant eye. Operation 1101 may include substantially the same process as operation 403 in FIG. 4. According to an embodiment, the processor 120 may identify the user's dominant eye and non-dominant eye based on information about the dominant eye and the non-dominant eye stored in the memory (e.g., memory 130 in FIG. 1) or based on direct user input. According to an embodiment, the processor 120 may identify the gaze direction corresponding to both eyes of the user by using at least one camera (e.g., eye tracking camera 313) included in the electronic device 101, and identify the user's dominant eye and non-dominant eye based on the identified gaze direction.

At operation 1103, the processor 120 may determine whether the user's right eye is the dominant eye. For example, the processor 120 may distinguish the user's dominant eye and the non-dominant eye, and may adjust the performance of the display panel corresponding to the non-dominant eye. According to an embodiment, if the right eye is the dominant eye among both eyes of the user, the left eye may be determined as the non-dominant eye. If the left eye is the dominant eye among both eyes of the user, the right eye may be determined to be the non-dominant eye.

If the right eye is determined to be the dominant eye at operation 1103, at operation 1105, the processor 120 may change at least some of the settings of the display panel corresponding to the left eye (e.g., the non-dominant eye). For example, the processor 120 may change at least some of the settings of the display panel corresponding to the non-dominant eye so that the quality of the above display panel is lowered. According to an embodiment, the processor 120 may change at least some of the settings of the display panel corresponding to the non-dominant eye when a specified condition is satisfied. For example, the processor 120 may lower the resolution of the display panel corresponding to the non-dominant eye if the illuminance sensing value is less than or equal to a threshold value, may reduce the frame rate if the movement of the content displayed on the display panel corresponding to the non-dominant eye is small, or may reduce the size of the display area of the display panel corresponding to the non-dominant eye if the movement of the user's pupil is small.

At operation 1107, the processor 120 may check whether the existing dominant eye (and/or non-dominant eye) has been changed. For example, the processor 120 may detect the movement of the user's pupils (e.g., left eye and right eye) by using at least one camera (e.g., eye tracking camera, such as 313 in FIG. 3). When the user gazes at a specific object, the processor 120 may identify the eye that mainly gaze at the object among both eyes. According to an embodiment, the processor 120 may periodically check the user's field of view by using at least one camera (e.g., eye tracking camera 313), and may determine that the dominant eye has been changed when the user's field of view is out of a preset area. For example, a change of the dominant eye may mean a change of the non-dominant eye. If the dominant eye (or, non-dominant eye) has not been changed, the processor 120 may branch to operation 1105, at which the processor 120 may adjust the performance of the display panel corresponding to the non-dominant eye based on a specified condition periodically or when a specified event occurs (e.g., movement of the electronic device 101, or change of the displayed virtual object). If the dominant eye (or non-dominant eye) has been changed, the processor 120 may branch to operation 1109.

If the dominant eye has been changed, at operation 1109, the processor 120 may adjust the performance of the display panel corresponding to the right eye (e.g., which now corresponds to the non-dominant eye).

In certain embodiments, the meaning that the electronic device 101 detects that the user's dominant eye and non-dominant eye have been changed may include detecting that when the user gazes at a specific object, the eye that mainly gazes at the object among both eyes has been changed. For example, while the user is gazing at an object with the dominant eye, when the user looks at the object through the non-dominant eye as the object is out of the field of view of the dominant eye, the electronic device 101 may determine that the user's dominant eye and non-dominant eye have been changed.

According to an embodiment, the electronic device 101 may periodically identify the user's dominant eye or non-dominant eye, and if the dominant eye (or non-dominant eye) has been changed, at least some of the settings of the display panel corresponding to the dominant eye (or non-dominant eye) may be changed. The electronic device 101 may identify the display panel corresponding to the changed non-dominant eye, and may change at least some of the settings of the corresponding display panel. According to an embodiment, the settings can be changed so that the quality of the display panel corresponding to the non-dominant eye is lower than the quality of the display panel corresponding to the dominant eye.

According to certain embodiments, the settings of a display panel may include a resolution setting of the display panel, a frame rate setting of the display panel, and/or a size setting of the display area of the display panel. The electronic device 101 may change at least one of a resolution setting of the display panel, a frame rate setting of the display panel, and/or a size setting of the display area of the display panel.

According to an embodiment, the electronic device 101 may change at least some of the settings of the display panel corresponding to the changed non-dominant eye at a level that the user cannot recognize. The electronic device 101 may reduce the amount of power consumed by the display panel, the usage time may be lengthened correspondingly, and heat generation of the electronic device 101 may be reduced.

According to certain embodiments, the electronic device 101 may check a condition for adjusting the quality for the dominant eye and/or the non-dominant eye periodically or when a specified event occurs (e.g., movement of the electronic device 101 or change of a displayed virtual object). For example, the condition for adjusting the quality for the dominant eye and/or non-dominant eye may include a change in the illuminance sensing value, a change in the movement of content displayed on the display panel, a change in the movement of the user's pupil, or a change between the dominant eye and the non-dominant eye. According to certain embodiments, upon identifying a condition for adjusting the quality for the dominant eye and/or non-dominant eye, the electronic device 101 may make at least one of a resolution change, a frame rate change, or a size change of the display area of the display panel, for the dominant eye and/or the non-dominant eye. For example, based on at least one of a case in which the illuminance sensing value is less than or equal to a threshold value, a case in which a change in the movement of content displayed on the display panel is small, or a case in which a change in the movement of the user's pupil is small, the electronic device 101 may perform at least one of an operation of lowering the resolution of the display panel corresponding to the non-dominant eye, an operation of lowering the frame rate, or an operation of reducing the size of the display area of the display panel.

Figure 12:
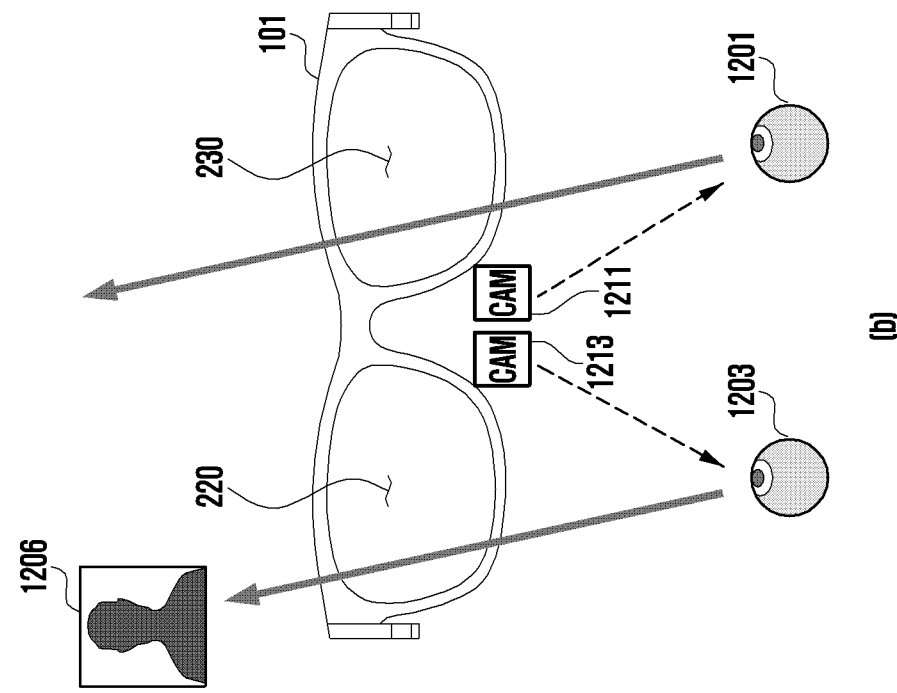
FIG. 12 is an illustrative diagram depicting a method for checking a change of the non-dominant eye and changing settings of the display panel corresponding to the changed non-dominant eye according to certain embodiments of the disclosure.
Figure 12:
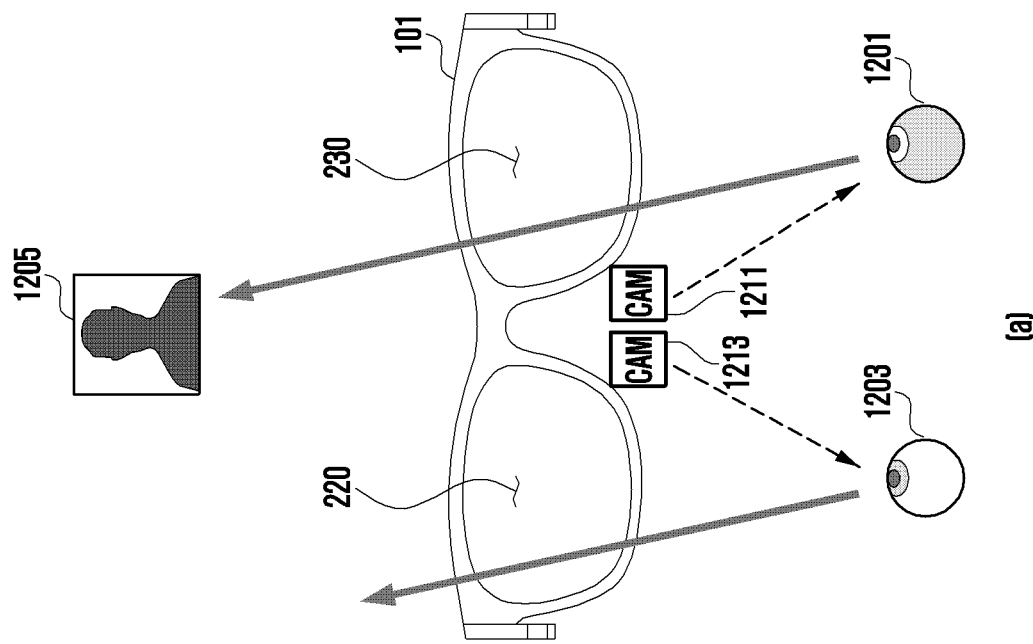

FIG. 12 is an illustrative diagram depicting a method for checking a change of the non-dominant eye and changing settings of the display panel corresponding to the changed non-dominant eye according to certain embodiments of the disclosure.

Situation [a] illustrates a situation in which the user gazes at a specific object 1205 located in front of the user. According to an embodiment, when the user gazes at the specific object 1205, a difference can be discerned between the dominant eye (e.g., right eye 1201) that is primarily used, and the non-dominant eye (e.g., left eye 1203) that is supplemental. The electronic device 101 (e.g., electronic device 101 in FIG. 1) may include at least one camera for tracking the user's pupils (e.g., first eye tracking camera 1211 for tracking the gaze direction of the right eye 1201, and/or second eye tracking camera 1213 for tracking the gaze direction of the left eye 1203). According to an embodiment, the electronic device 101 may identify the dominant eye (e.g., right eye 1201) and non-dominant eye (e.g., left eye 1203) among the eyes that gaze at the specific object 1205. According to an embodiment, the electronic device 101 may change at least some of the settings of the display panel included in the first glass 220 (e.g., first glass 220 in FIG. 2A) corresponding to the left eye 1203 being the non-dominant eye. The electronic device 101 may change at least some of the settings to lower the quality of the display panel corresponding to the left eye 1203 being the non-dominant eye.

Situation [b] illustrates a situation in which a specific object 1206 moves to one side with respect to the electronic device 101 and then the user gazes at the specific object 1206. Previously, the user's right eye 1201 was set as the dominant eye, and the left eye 1203 may have been set as the non-dominant eye. According to an embodiment, when the specific object 1206 moves to one side and is out of the field of view of the right eye 1201, the dominant eye may be changed from the right eye 1201 to the left eye 1203. The change of the dominant eye from the right eye 1201 to the left eye 1203 may likewise indicate that the non-dominant eye is changed from the left eye 1203 to the right eye 1201. According to an embodiment, the electronic device 101 may confirm that the dominant eye and the non-dominant eye gazing at the specific object 1206 have been changed, using the first eye tracking camera 1211 and the second eye tracking camera 1213. According to an embodiment, in response to the change of the dominant eye, the electronic device 101 may change at least some of the settings of the display panel included in the second glass 230 (e.g., second glass 230 in FIG. 2A) corresponding to the changed non-dominant eye. The electronic device 101 may change at least some of the settings to lower the quality of the display panel corresponding to the right eye 1201 being the non-dominant eye.

According to an embodiment, the electronic device 101 may periodically check the fields of view of both of the user's eyes (e.g., left eye or right eye). The electronic device 101 may detect whether the object the user is gazing at is out of the field of view of the eye corresponding to the dominant eye, and may determine that the dominant eye has been changed if the object is out of the field of view of the dominant eye.

According to an embodiment, upon confirming a change of the dominant eye (or non-dominant eye), the electronic device 101 may change the display performance of the display panel corresponding to the non-dominant eye. For example, when the non-dominant eye has been shifted from the left eye 1203 to the right eye 1201, the electronic device 101 may lower the display performance of the display panel corresponding to the right eye 1201. Correspondingly, when the dominant eye has been shifted from the right eye 1201 to the left eye 1203, the electronic device 101 may restore the display performance of the display panel corresponding to the left eye 1203 to the initial settings. For example, the display performance of the display panel corresponding to the left eye 1203 may be better than the display performance of the display panel corresponding to the right eye 1201.

Figure 13A:
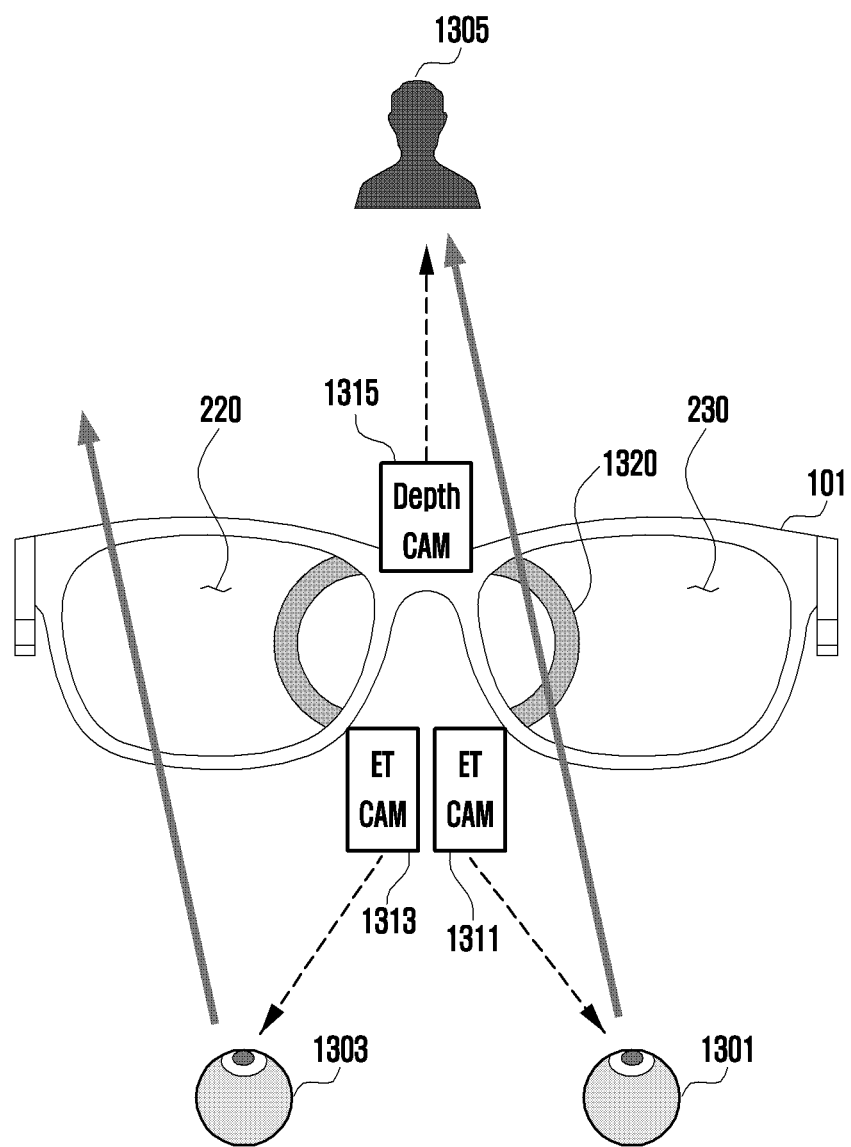
FIG. 13A is a first illustrative diagram depicting a method for detecting the dominant eye and non-dominant eye according to certain embodiments of the disclosure.
Figure 13B:
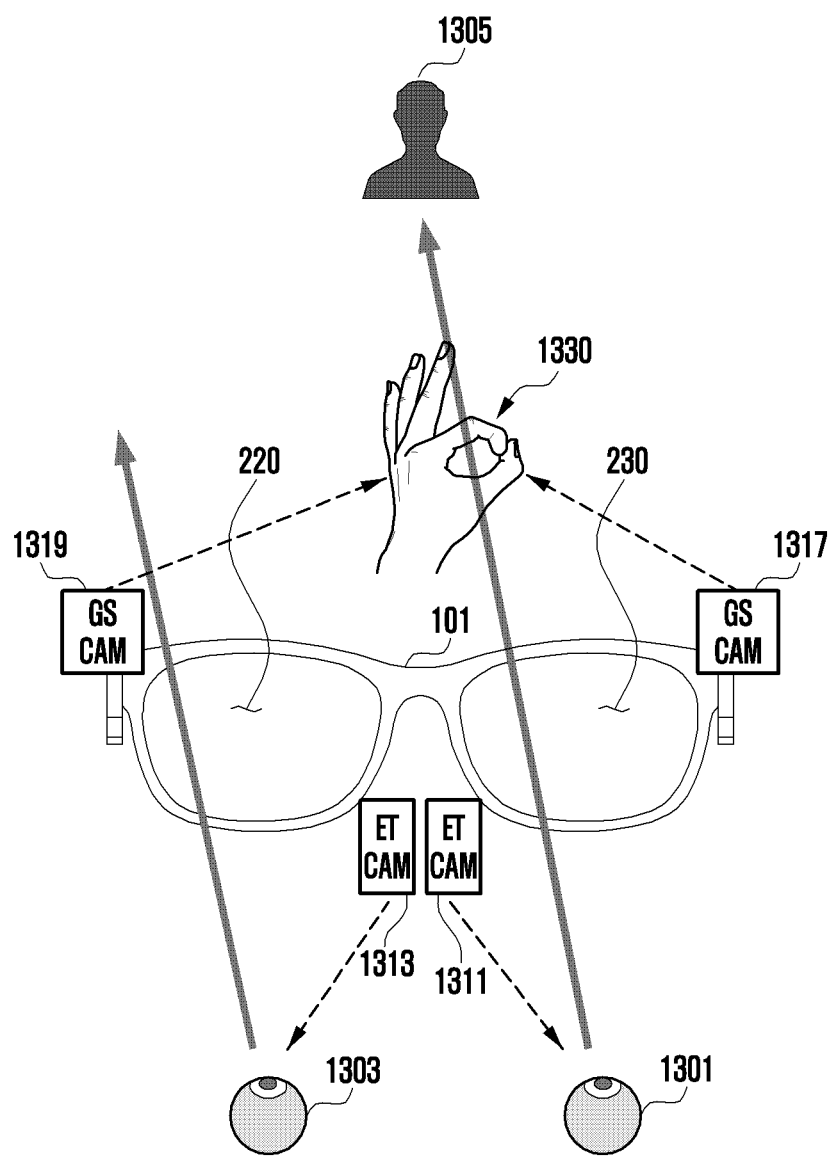
FIG. 13B is a second illustrative diagram depicting a method for detecting the dominant eye and non-dominant eye according to certain embodiments of the disclosure.

FIGS. 13A and 13B are illustrative diagrams depicting a method for detecting the dominant eye and non-dominant eye according to certain embodiments of the disclosure. FIG. 13A illustrates a situation in which a virtual object 1320 having a circular shape is displayed at least partially on at least one display panel, and the eye gazing at a specific object 1305 through the virtual object 1320 is determined as the dominant eye. FIG. 13B illustrates a situation in which a circle made by the user's finger is recognized as a temporary object (e.g., via formation of the hand gesture 1330) and the eye gazing at a specific object 1305 through the temporary object (e.g., as part of gesture 1330) is determined as the dominant eye.

With reference to FIG. 13A, the electronic device 101 (e.g., electronic device 101 in FIG. 1) may include at least one camera (e.g., first eye tracking camera 1311 for tracking the gaze direction of the right eye 1301, and/or second eye tracking camera 1313 for tracking the gaze direction of the left eye 1303) for tracking the user's pupils. The electronic device 101 may include a distance measuring camera 1315 (e.g., distance measuring camera 315 in FIG. 3) to measure the distance to the specific object 1305. According to an embodiment, the electronic device 101 may identify the gaze directions of both of the user's eyes (e.g., right eye 1301 and/or left eye 1303) by using the first eye tracking camera 1311 and/or the second eye tracking camera 1313. The electronic device 101 may determine the right eye 1301, which corresponds to the gaze direction gazing at the specific object 1305 while passing through the virtual object 1320 formed on at least one display panel, to be the dominant eye. (e.g., the left eye 1303 may be determined as the non-dominant eye.)

According to an embodiment, the electronic device 101 may measure the distance to the specific object 1305 by using the distance measuring camera 1315. According to an embodiment, if the measured distance is greater than or equal to a threshold value, the electronic device 101 may identify the gaze directions of both of the user's eyes (e.g., right eye 1301 and/or left eye 1303) by using the first eye tracking camera 1311 and/or the second eye tracking camera 1313. The electronic device 101 may distinguish the dominant eye and the non-dominant eye based on the identified gaze directions. For example, in case of confirming that the gaze direction of the right eye 1301 is the direction gazing at the specific object 1305 while passing through the virtual object 1320 formed on the first glass 220 (e.g., first glass 220 in FIG. 2A) and/or the second glass 230 (e.g., second glass 230 in FIG. 2A), the electronic device 101 may determine the user's right eye 1301 as the dominant eye. Correspondingly, the user's left eye 1303 may be determined as the non-dominant eye. According to an embodiment, the electronic device 101 may change the settings of the display panel corresponding to the left eye 1303 being the non-dominant eye to lower the quality of this display panel.

According to another embodiment, if the distance to the specific object 1305 measured using the distance measuring camera 1315 is greater than or equal to a set threshold value, the electronic device 101 may display a virtual object on the display panel and identify the user's dominant eye and non-dominant eye. For example, when the distance to the specific object 1305 is less than the set threshold value, the electronic device 101 may not change the display performance of the display panel corresponding to the non-dominant eye.

According to an embodiment, while gazing at the specific object 1305 at a specified distance or more using the distance measuring camera 1315, the electronic device 101 may identify the gaze directions of the left eye and the right eye by using the first eye tracking camera 1311 or the second eye tracking camera 1313, and identify at least one of the dominant eye or the non-dominant eye among the left eye and the right eye based on the identified gaze direction related information. For example, when the distance to the specific object 1305 is less than the set threshold value, the electronic device 101 may not change the display performance of the display panel corresponding to the non-dominant eye.

With reference to FIG. 13B, the electronic device 101 (e.g., electronic device 101 in FIG. 1) may include at least one camera (e.g., first eye tracking camera 1311 for tracking the gaze direction of the right eye 1301, and/or second eye tracking camera 1313 for tracking the gaze direction of the left eye 1303) for tracking the user's pupils. The electronic device 101 may include gesture cameras 1317 and 1319 (e.g., gesture camera 311 in FIG. 3) for detecting a user's gesture within a specific distance. According to an embodiment, the electronic device 101 may identify the gaze directions of both of the user's eyes (e.g., right eye 1301 and/or the left eye 1303) by using the first eye tracking camera 1311 and/or the second eye tracking camera 1313. The electronic device 101 may detect a user's gesture 1330 (e.g., gesture of making a certain circle with fingers) by using at least one gesture camera 1317 and 1319. The electronic device 101 may determine the right eye 1301, which corresponds to the gaze direction gazing at the specific object 1305 while passing through the circle formed by the user's gesture 1330, as the dominant eye. (e.g., the left eye 1303 may be determined as the non-dominant eye.) According to an embodiment, the electronic device 101 may lower the display performance of the display panel corresponding to the left eye 1303 being the non-dominant eye.

According to certain embodiments, the method of detecting the user's dominant eye and/or non-dominant eye is not limited to the embodiment shown in FIG. 13A and/or FIG. 13B.

According to an embodiment, the electronic device 101 may display a virtual object through the first display panel included in the first glass 220 corresponding to the user's right eye 1301 and/or the second display panel included in the second glass 230 corresponding to the user's left eye 1302. The processor 120 of the electronic device 101 may track the user's gaze direction toward the virtual object through the first eye tracking camera 1311 for tracking the gaze direction of the right eye 1301 and/or the second eye tracking camera 1313 for tracking the gaze direction of the left eye 1303, and may detect the user's dominant eye and/or non-dominant eye based on the gaze direction.

Figure 14:
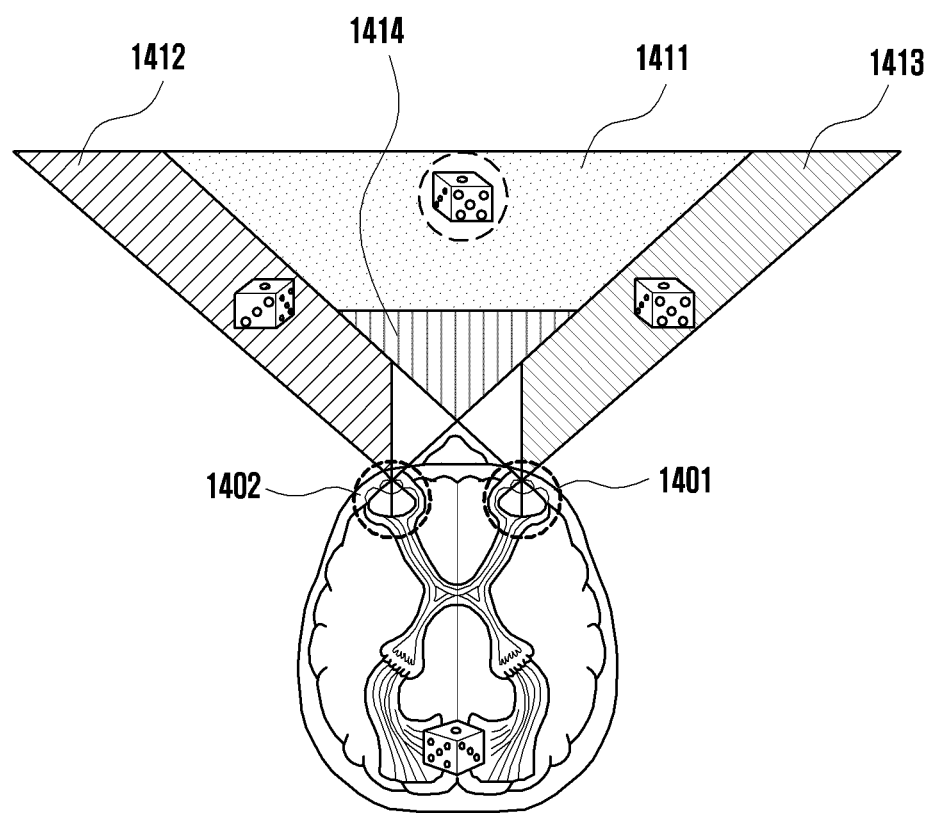
FIG. 14 is an illustrative diagram depicting a method of detecting the dominant eye and non-dominant eye based on regions of the field of view according to certain embodiments of the disclosure.

FIG. 14 is an illustrative diagram depicting a method of detecting the dominant eye and non-dominant eye based on regions of the field of view according to certain embodiments of the disclosure.

In FIG. 14, the area of the field of view in which the user recognizes objects through the right eye 1401 and/or the left eye 1402 may be divided into a plurality of regions (e.g., first region 1411, second region 1412, third region 1413, and/or fourth region 1414).

According to an embodiment, the first region 1411 may be defined as a region in which the user's right eye 1401 and left eye 1402 have substantially equivalent dominance. For example, when the user gazes at an object located in the first region 1411, the electronic device 101 may identify the user's gaze direction by using at least one camera (e.g., eye tracking camera 313 in FIG. 3) and determine the user's dominant eye and/or non-dominant eye.

According to an embodiment, the second region 1412 may be defined as a region in which the user's left eye 1402 has dominance. For example, when the user looks at an object located in the second region 1412, the user's left eye 1402 may be determined as the dominant eye, and the user's right eye 1401 may be determined as the non-dominant eye.

According to an embodiment, the third region 1413 may be defined as a region in which the user's right eye 1401 has dominance. For example, when the user looks at an object located in the third region 1413, the user's right eye 1401 may be determined as the dominant eye, and the user's left eye 1402 may be determined as the non-dominant eye.

According to an embodiment, the fourth region 1414 may be defined as a region in which dominance of the user's right eye 1401 or left eye 1402 is ignored. For example, when the user looks at an object located in the fourth region 1414, it may be difficult to determine the dominant eye and/or non-dominant eye because the position of the object is too close to the user's face.

The area of the field of view for recognizing things is divided into four regions in FIG. 14, but according to certain embodiments, the area of the field of view for recognizing things may be divided into four or more regions or four or less regions.

According to certain embodiments, the electronic device 101 may identify the dominant eye and/or non-dominant eye based on the user's left and right eyes, and may, among the first display panel corresponding to the left eye and the second display panel corresponding to the right eye, change the settings of the display panel corresponding to the identified non-dominant eye to be at least partially different from the settings of the display panel corresponding to the identified dominant eye. For example, the electronic device 101 may at least partially change the settings of the display panel corresponding to the non-dominant eye so as to lower the display performance of this display panel.

A method according to certain embodiments may include: identifying, using one or more of a first camera (e.g., distance measuring camera 315 in FIG. 3) configured to capture a frontal external environment of the electronic device 101 (e.g., electronic device 101 in FIG. 1) or a second camera (e.g., eye tracking camera 313 in FIG. 3) oriented opposite to the first camera and configured to capture the gaze directions of the user's left and right eyes, the first camera and second camera being included in the electronic device 101, the dominant eye and/or non-dominant eye from among the user's left eye and the right eye; identifying, using at least one processor, a dominant display panel from among first and second display panels corresponding to the dominant eye, and a non-dominant display panel from among the first and second display panels corresponding to the non-dominant eye; and changing settings of the dominant display panel to be different from settings of the non-dominant display panel.

According to an embodiment, identifying the dominant eye and non-dominant eye may include: measuring a distance to an object using the first camera; identifying the gaze directions of the left eye and the right eye by using the second camera 313 based on determining that the measured distance exceeds a threshold value; and identifying the dominant eye and non-dominant eye from among the left eye and the right eye based on the captured gaze directions.

According to an embodiment, changing the settings of the dominant display panel may include: determining whether the brightness value measured using an illuminance sensor (e.g., illuminance sensor 322 in FIG. 3) is less than or equal to a threshold value; and reducing the display resolution of the non-dominant display panel corresponding to the non-dominant eye based on determining that the brightness value is less than or equal to the threshold value.

The method according to an embodiment may further include: detecting movement of an object to which the gaze of the user is directed based on the gaze direction; determining whether the movement of the object exceeds a preset reference value; and reducing a frame rate of the non-dominant display panel corresponding to the non-dominant eye based on determining that the movement exceeds the reference value.

The method according to an embodiment may further include: determining whether the dominant eye is changed based on detection of a left-eye gaze direction and a right-eye gaze direction; based on determining that the dominant eye is changed from the right eye to the left eye, changing at least some of the settings of the display panel corresponding to the right eye; and based on determining that the dominant eye is changed from the right eye to the left eye, reverting the settings of the display panel corresponding to the left eye to initial settings.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The embodiments of the present disclosure and the accompanying drawings are only examples in order to easily describe the present disclosure and facilitate comprehension of the present disclosure, but are not intended to limit the present disclosure. Therefore, in addition to the embodiments disclosed herein, the present disclosure should be construed to include all modifications or modified forms drawn based on the present disclosure and is defined by the appended claims and their equivalents.

The invention claimed is:

1. An electronic device, comprising:
a first camera configured to capture a frontal external environment of the electronic device;
a second camera oriented opposite to the first camera and configured to identify gaze directions of a user's left eye and right eye;
a first display panel corresponding to the left eye;
a second display panel corresponding to the right eye;
a memory; and
a processor operably connected to the first camera, the second camera, the first display panel, the second display panel, and the memory,
wherein the processor is configured to:
identify a dominant eye and a non-dominant eye among the left eye and right eye based on the gaze directions of the user's left eye and the user's right eye,
identify a dominant display panel from among the first and second display panels corresponding to the dominant eye, and a non-dominant display panel from among the first and second display panels corresponding to the non-dominant eye,
identify movement of an object to which a gaze of the user is directed based on a direction of the gaze, and
change settings of the dominant display panel to be different from settings of the non-dominant display panel based on the movement of the object.

2. The electronic device of claim 1, wherein the processor is configured to:
identify the gaze directions of the user's left eye and the user's right eye using at least one of the first camera or the second camera, and
identify the dominant eye and the non-dominant eye among the left eye and the right eye based on the identified gaze directions.

3. The electronic device of claim 2, wherein the processor is configured to:
measure a distance to an object using the first camera,
identify the gaze directions of the left eye and right eye using the second camera based on detecting that the measured distance exceeds a threshold value, and
change at some of the settings of the non-dominant display panel corresponding to the non-dominant eye based on determining that the measured distance exceeds a threshold value.

4. The electronic device of claim 1, further comprising an illuminance sensor to detect ambient brightness, and wherein the processor is further configured to:
identify whether an ambient brightness value measured using the illuminance sensor is less than or equal to a threshold value, and
reduce a display resolution of the non-dominant display panel corresponding to the non-dominant eye based on determining that the ambient brightness value is less than or equal to the threshold value.

5. The electronic device of claim 1, wherein the processor is configured to:
identify whether the movement of the object is below a preset reference value, and
reduce a frame rate of the non-dominant display panel corresponding to the non-dominant eye based on determining the movement is below the preset reference value.

6. The electronic device of claim 1, wherein the processor is further configured to:
reduce one or more of a resolution and a frame rate of the non-dominant display panel corresponding to the non-dominant eye, based on a preset time interval.

7. The electronic device of claim 1, wherein the processor is further configured to:
detect eye movement of the left eye and the right eye,
determine whether the detected eye movement exceeds a preset reference value, and
reduce a display area of the non-dominant display panel corresponding to the non-dominant eye based on determining that the eye movement exceeds the preset reference value.

8. The electronic device of claim 1, wherein the processor is further configured to:
display a virtual object on the first display panel and the second display panel, and
identify, using the second camera, a left-eye gaze direction and a right-eye gaze direction, as the user gazes at an object through the displayed virtual object,
wherein the non-dominant eye is identified from among the left eye and the right eye based on the identified left-eye and right-eye gaze directions.

9. The electronic device of claim 1, further comprising a third camera configured to detect a user's gesture, and wherein the processor is further configured to:
detect a position of a user's hand using the third camera, as the user's hand forms a circle,
identify a left-eye gaze direction and a right-eye gaze direction as the user gazes at an object through the circle, using the second camera, and
wherein the non-dominant eye is identified from among the left eye and the right eye based on the identified left-eye and right-eye gaze directions.

10. The electronic device of claim 1, wherein the processor is further configured to:

determine whether the dominant eye is changed based on detection of a left-eye gaze direction and a right-eye gaze direction, and based on determining that the dominant eye has been changed from the right eye to the left eye, change at least some of the settings of the display panel corresponding to the right eye, or revert the settings of the display panel corresponding to the left eye to initial settings.

11. A method of an electronic device, the method comprising:

identifying, using one or more of a first camera configured to capture a frontal external environment of the electronic device, or a second camera oriented opposite to the first camera and configured to identify gaze directions of user's left and right eyes, a dominant eye and a non-dominant eye from among the user's left eye and right eye based on the gaze directions of the user's left eye and the user's right eye;

identifying, using at least one processor, a dominant display panel from among first and second display panels corresponding to the dominant eye, and a non-dominant display panel from among the first and second display panels corresponding to the non-dominant eye;

identifying, movement of an object to which a gaze of the user is directed based on a direction of the gaze; and changing settings of the dominant display panel to be different from settings of the non-dominant display panel based on the movement of the object.

12. The method of claim 11, wherein identifying the dominant eye and the non-dominant eye further comprises:

measuring a distance to an object using the first camera;

identifying gaze directions of the left eye and the right eye by using the second camera based on determining that the measured distance exceeds a threshold value; and identifying the dominant eye and non-dominant eye from among the left eye and the right eye based on the identified gaze directions.

13. The method of claim 11, wherein changing the settings of the dominant display panel comprises:

determining whether an ambient brightness value measured using an illuminance sensor is less than or equal to a threshold value; and reducing a display resolution of the non-dominant display panel corresponding to the non-dominant eye based on determining that the ambient brightness value is less than or equal to the threshold value.

14. The method of claim 11, further comprising:

determining whether the movement of the object is below a preset reference value; and reducing a frame rate of the non-dominant display panel corresponding to the non-dominant eye based on determining that the movement is below the preset reference value.

15. The method of claim 11, further comprising:

determining whether the dominant eye is changed based on detection of a left-eye gaze direction and a right-eye gaze direction;

based on determining that the dominant eye is changed from the right eye to the left eye, changing at least some of the settings of the display panel corresponding to the right eye; and based on determining that the dominant eye is changed from the right eye to the left eye, reverting the settings of the display panel corresponding to the left eye to initial settings.

\* \* \* \* \*